(12) United States Patent
Hedrick et al.

(10) Patent No.: US 9,243,107 B2
(45) Date of Patent: Jan. 26, 2016

(54) METHODS OF PREPARING POLYHEMIAMINALS AND POLYHEXAHYDROTRIAZINES

(71) Applicant: International Business Machines Corporation, Armonk, NY (US)

(72) Inventors: James L. Hedrick, Pleasanton, CA (US); Hans W. Horn, San Jose, CA (US); Gavin O. Jones, San Jose, CA (US); Jeannette M. O'Brien, San Jose, CA (US); Kumar R. Virwani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 14/050,995

(22) Filed: Oct. 10, 2013

(65) Prior Publication Data

US 2015/0104579 A1  Apr. 16, 2015

(51) Int. Cl.
  *B05D 3/02* (2006.01)
  *C08G 65/00* (2006.01)
  *C09D 171/00* (2006.01)

(52) U.S. Cl.
  CPC .............. *C08G 65/00* (2013.01); *C09D 171/00* (2013.01)

(58) Field of Classification Search
  CPC ...... C07D 251/04; C08G 12/08; C08G 65/00; B05D 3/02; C09D 171/00
  USPC ..................................................... 427/385.5
  See application file for complete search history.

(56) References Cited

U.S. PATENT DOCUMENTS

| | | |
|---|---|---|
| 2,889,277 A | 6/1959 | Hughes et al. |
| 4,106,904 A | 8/1978 | Oude Alink et al. |
| 4,224,417 A | 9/1980 | Hajek et al. |
| 4,225,481 A | 9/1980 | Wagner |
| 4,246,160 A | 1/1981 | Wagner et al. |
| 4,301,262 A | 11/1981 | Wagner et al. |
| 5,830,243 A | 11/1998 | Wolak et al. |

(Continued)

FOREIGN PATENT DOCUMENTS

| | | |
|---|---|---|
| GB | 928112 | 6/1963 |
| GB | 1531578 | 11/1978 |

(Continued)

OTHER PUBLICATIONS

Elbert, et al. "Conjugate Addition Reactions Combined with Free-Radical Cross-Linking for the Design of Materials for Tissue Engineering," Biomacromolecules 2001, 2, 430-441; Published on Web Mar. 3, 2001.

(Continued)

*Primary Examiner* — Robert S Walters, Jr.
(74) *Attorney, Agent, or Firm* — Michael R. Roberts

(57) ABSTRACT

Polyhexahydrotriazine (PHT) film layers are formed by a process comprising heating a first mixture comprising i) a solvent, ii) paraformaldehyde, and iii) a diamine monomer comprising two primary aromatic amine groups at a temperature of about 20° C. to less than 150° C. This heating step forms a stable polyhemiaminal (PHA) in solution, which can be cast on a surface of a substrate, thereby forming an initial film layer comprising the PHA. The initial film layer is heated at a temperature of 180° C. to about 280° C., thereby converting the PHA film layer to a PHT film layer. Young's moduli of about 8 GPA to about 14 GPA have been observed for the PHT film layers.

8 Claims, 22 Drawing Sheets

(56) References Cited

U.S. PATENT DOCUMENTS 7,384,434 B2 6/2008 Malfer et al.
2010/0107476 A1 5/2010 Cosimbescu et al.

FOREIGN PATENT DOCUMENTS

| | | |
|---|---|---|
| JP | 2010077245 A1 | 4/2010 |
| WO | 0166614 A3 | 9/2001 |
| WO | 0198388 A1 | 12/2001 |
| WO | 0226849 A1 | 4/2002 |
| WO | 2009157426 A1 | 12/2009 |

OTHER PUBLICATIONS

Ferrar, "Reactions of Formaldehyde With Aromatic Amines," J. Appl. Chem, 14, 1964, 389-399.
Geng, et al., "Nanoindentation behavior of ultrathin polymeric films," Polymer 46 (2005) 11768-11772; Available online Oct. 19, 2005.
Hiller, et al., "Laser-engravable hexahydrotriazine polymer networks," Mat Res Innovat (2002) 6:179-184.
Oliver, et al. "Measurement of hardness and elastic modulus by instrumented indentation: Advances in understanding and refinements to methodology," J. Mater. Res., vol. 19, No. 1, Jan. 2004, 3-20.
Singh, et al., "Ultrasound mediated Green Synthesis of Hexa-hydro Triazines," J. Mater. Environ. Sci. 2 (4) (2011) 403-406.
Stafford, et al., "A buckling-based metrology for measuring the elastic moduli of polymeric thin films," Nature Materials_3_Aug. 2004, 545-550;Published online: Jul. 11, 2004.
Chinese Patent Office PCT Search Report, Dec. 29, 2014.
Kakaneiadifard, et al., "Synthesis and Conformational Analysis of 3,5,7-Triaryl-1,3,5,7-oxatriazocanes", Asian Journal of Chemistry, 2008, 20, 4706-4712.

METHODS OF PREPARING POLYHEMIAMINALS AND POLYHEXAHYDROTRIAZINES

BACKGROUND

The present invention relates to methods of preparing polyhemiaminals polyhexahydrotriazines, and more specifically to preparing polyhemiaminals and polyhexahydrotriazines derived from aromatic diamines, and films therefrom.

Commercially important nitrogen-containing polymers include polyamides (nylon), polyimides (Kaplon, UPILEX, VTEC), and polyamines. Between these three classes of materials, nitrogen-rich polymers have applications in adhesives, semiconductors, automotive components, electronics, sporting goods, coatings, bottles, foams, yarns, plumbing parts, paints, and hospital equipment, to name a few. Though widely used, nitrogen-containing polymers can be flexible, hygroscopic materials sensitive to acids, bases and oxidants, which prevents their use in other applications.

A need exists for chemically resistant nitrogen-containing polymers that have high rigidity and high tensile strength.

SUMMARY

Accordingly, A polyhexahydrotriazine (PHT) is disclosed, comprising:

a plurality of trivalent hexahydrotriazine groups having the structure

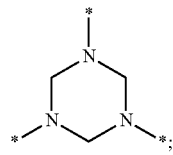

and
a plurality of divalent bridging groups of formula (2):

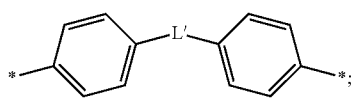

wherein

L' is a divalent linking group selected from the group consisting of *—O—*, *—S—*, *—N(R')—*, *—N(H)—*, *—R"—*, and combinations thereof, wherein R' comprises at least 1 carbon and R" comprises at least one carbon, each starred bond of a given hexahydrotriazine group is covalently linked to a respective one of the divalent bridging groups, and each starred bond of a given bridging group is linked to a respective one of the hexahydrotriazine groups.

Also disclosed is a method, comprising:

forming a reaction mixture comprising a i) solvent, ii) paraformaldehyde, and iii) a monomer comprising two primary aromatic amine groups; and heating the reaction mixture at a temperature of 150° C. to about 280° C., thereby forming a polyhexahydrotriazine (PHT).

Another method is disclosed, comprising:

forming a first mixture comprising a i) solvent, ii) paraformaldehyde, and iii) a monomer comprising two primary aromatic amine groups;

heating the first mixture at a temperature of about 20° C. to about 120° C., thereby forming a second mixture comprising a polyhemiaminal (PHA);

casting the second mixture on a surface of a substrate, thereby forming an initial film layer disposed on the surface, the initial film layer comprising the PHA and the solvent; and heating the initial film layer at a temperature of 150° C. to about 280° C., thereby forming a second film layer comprising a polyhexahydrotriazine (PHT).

Further disclosed is a film layer comprising the above-described polyhexahydrotriazine (PHT).

Also disclosed is a device comprising the above-described film layer.

Another device is disclosed, comprising:

a layer comprising a polyhemiaminal (PHA) disposed on a surface of a substrate, the PHA comprising a plurality of trivalent hemiaminal groups having the structure

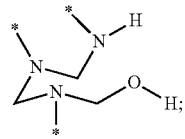

and
a plurality of divalent bridging groups of formula (2):

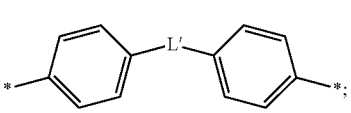

wherein

L' is a divalent linking group selected from the group consisting of *—O—*, *—S—*, *—N(R')—*, *—N(H)—*, *—R"—*, and combinations thereof, wherein R' comprises at least 1 carbon and R" comprises at least one carbon, each starred bond of a given hemiaminal group is covalently linked to a respective one of the divalent bridging groups, and each starred bond of a given bridging group is linked to a respective one of the hemiaminal groups.

The above-described and other features and advantages of the present invention will be appreciated and understood by those skilled in the art from the following detailed description, drawings, and appended claims.

DETAILED DESCRIPTION

Figure 1:
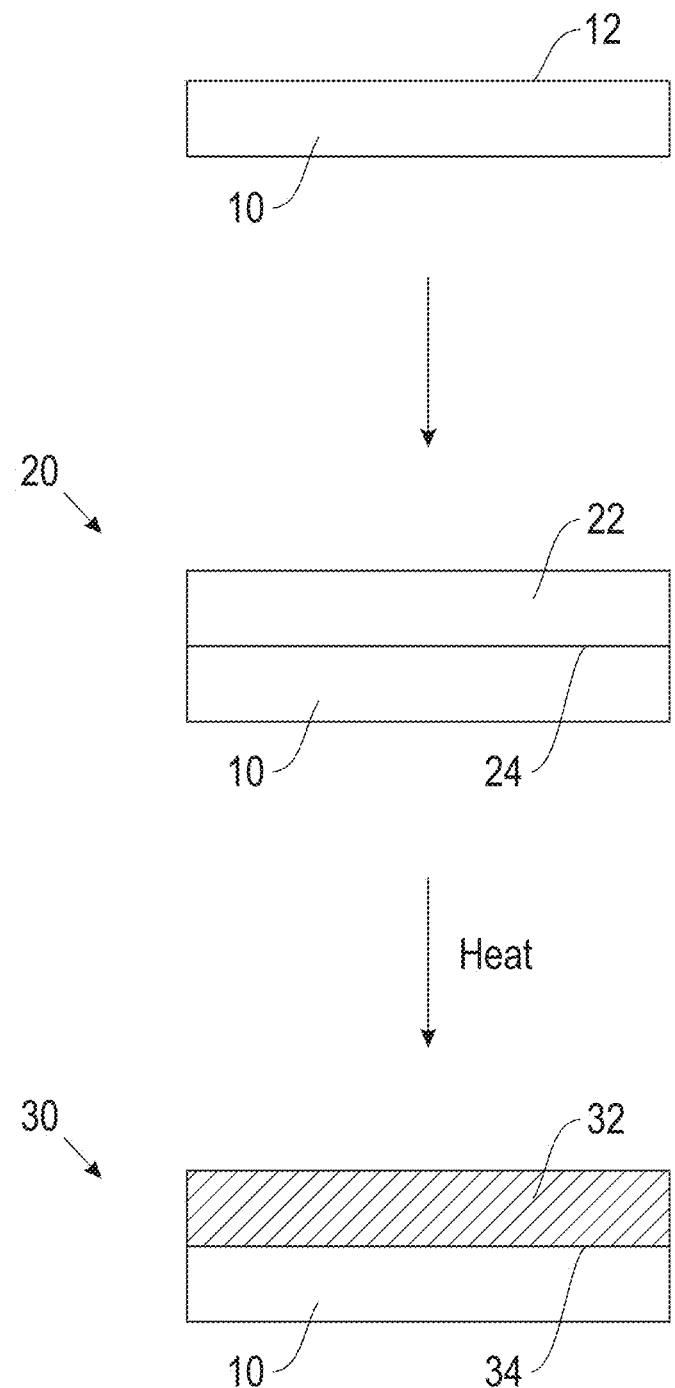
FIG. 1 is a series of cross-sectional layer diagrams illustrating the preparation of a polyhemiaminal (PHA) film.

Methods are disclosed for preparing polyhemiaminals (PHAs) and polyhexahydrotriazines (PHTs) by the reaction of aromatic diamines and paraformaldehyde. The PHAs and PHA films are stable intermediates in the preparation of the PHTs and PHT films, respectively. The PHAs are generally prepared at a temperature of about 20° C. to about 120° C., more, preferably at about 20° C. to about 100° C., and most preferably at about 40° C. to about 60° C. The PHAs form films when cast from a polar aprotic solvents (e.g., NMP), and the PHA films are stable at a temperature of about 20° C. to less than 150° C. The PHA films can have a Young's modulus of about 6 GPa, which is exceptionally high for an organic film.

The PHT films are formed by thermally treating a PHA film at a temperature of at least 150° C., preferably about 165° C. to about 280° C., more preferably about 180° C. to about 210° C., and most preferably about 190° C. to about 210° C. for a period of time of about 1 minute to about 24 hours, and more preferably about 1 hour. The PHT films can have high heat resistance as measured by dynamic mechanical analysis (DMA). The PHT films can also have a high Young's modulus as measured by nanoindentation methods. In some instances, the Young's modulus of a PHT film can have a value in a range of about 8 GPa to about 14 GPa, exceeding that of bone (9 GPA).

Herein, a polyhemiaminal (PHA) is a crosslinked polymer comprising i) a plurality of trivalent hemiaminal groups of formula (1):

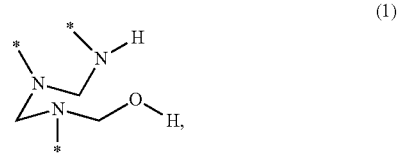

covalently linked to ii) a plurality of bridging groups of formula (2):

wherein y' is 2 or 3, and K' is a divalent or trivalent radical comprising at least one 6-carbon aromatic ring. Herein, starred bonds represent attachment points to other portions of the chemical structure. Each starred bond of a given hemiaminal group is covalently linked to a respective one of the bridging groups. Additionally, each starred bond of a given bridging group is covalently linked to a respective one of the hemiaminal groups.

As an example, a polyhemiaminal can be represented herein by formula (3):

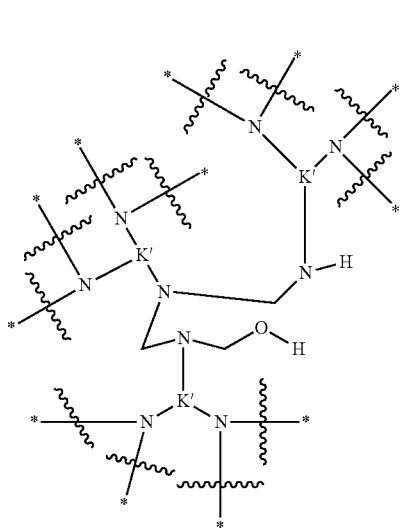

(3)

In this instance, each K' is a trivalent radical (y'=3) comprising at least one 6-carbon aromatic ring. It should be understood that each nitrogen having two starred wavy bonds in formula (3) is a portion of a different hemiaminal group.

The structure of formula (3) can also be represented using the notation of formula (4):

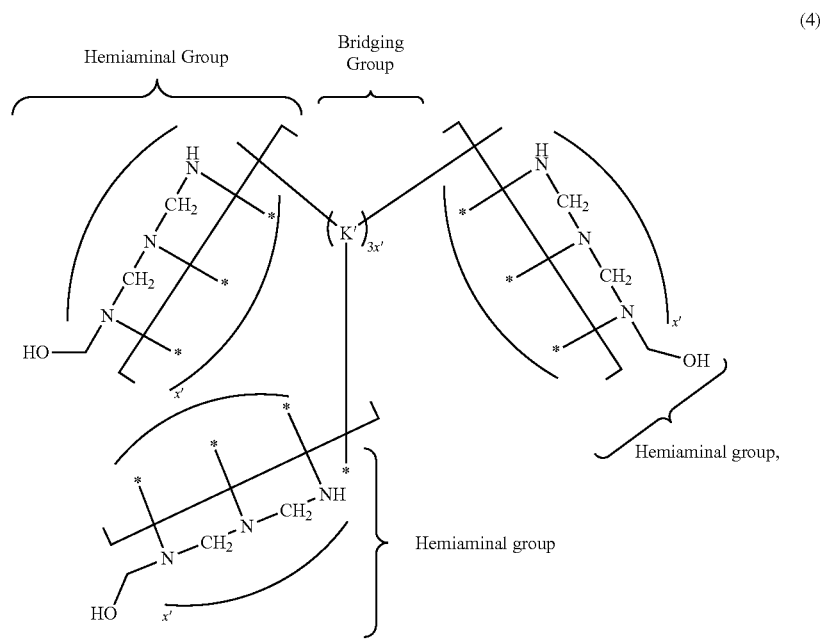

(4)

wherein x' is moles and each bridging group K' is a trivalent radical (y'=3 in formula (2)) comprising at least one 6-carbon aromatic ring. It should be understood that each starred nitrogen bond of a given hemiaminal group of formula (4) is covalently linked to a respective one of the bridging groups K'. Additionally, each starred bond of a given bridging group K' of formula (4) is covalently linked to a respective one of the hemiaminal groups.

Non-limiting exemplary trivalent bridging groups include:

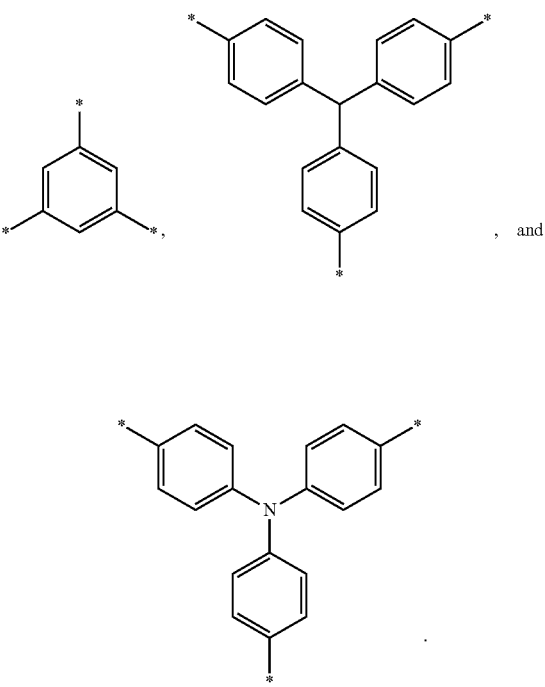

, and

The bridging groups can be used singularly or in combination.

The remainder of the description discusses divalent bridging groups K'. It should be understood that the methods and principles below also apply to trivalent linking groups.

Polyhemiaminals composed of divalent bridging groups K' can be represented herein by formula (5):

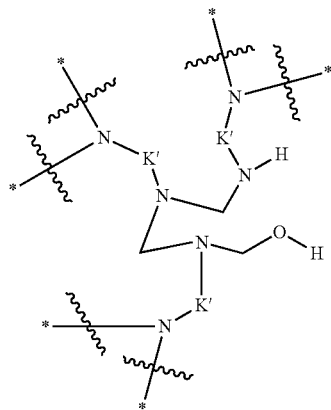
(5)

wherein K' is a divalent radical (y'=2 in formula (2)) comprising at least one 6-carbon aromatic ring. Each nitrogen having two starred wavy bonds in formula (5) is a portion of a different hemiaminal group.

More specific divalent bridging groups have the formula (6):

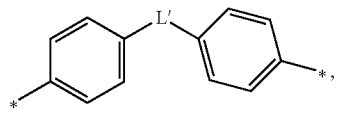
(6)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. In an embodiment, R' and R" are independently selected from the group consisting of methyl, ethyl, propyl, isopropyl, phenyl, and combinations thereof. Other L' groups include methylene (*—CH$_2$—*), isopropylidenyl (*—C(Me)$_2$-*), and fluorenylidenyl:

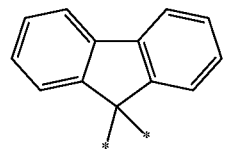

Polyhemiaminals composed of divalent bridging groups of formula (6) can be represented herein by formula (7):

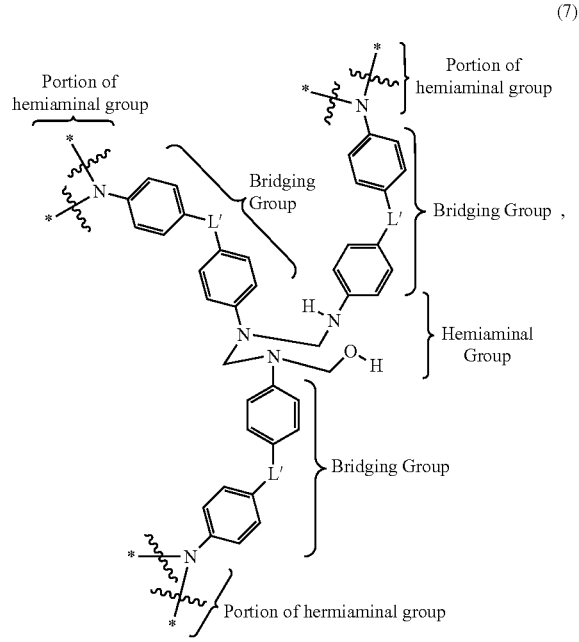
(7)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. Each nitrogen having two starred wavy bonds in formula (7) is a portion of a different hemiaminal group.

The polyhemiaminal of formula (7) can also be represented by the notation of formula (8):

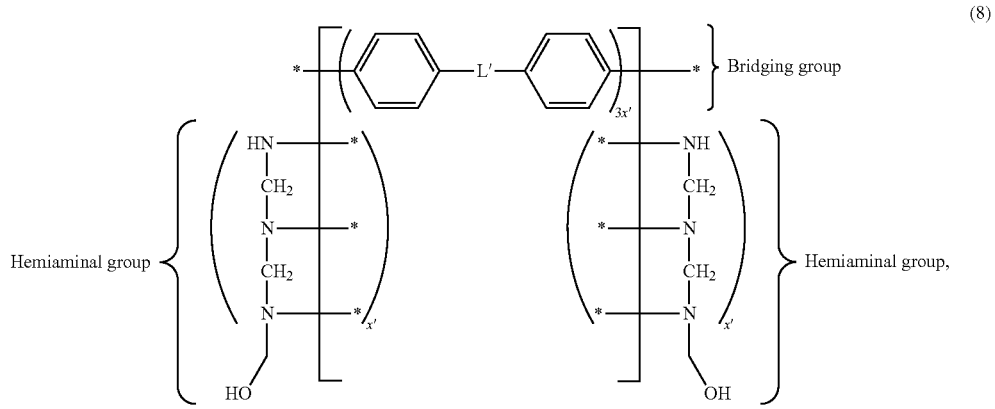
(8)

wherein x' is moles, and L' is a divalent linking group selected from the group consisting of *—O—*, *—S—*, *—N(R')—*, *—N(H)—*, *—R"—*, and combinations thereof, wherein R' and R" independently comprise at least 1 carbon. Each starred nitrogen bond of a given hemiaminal group of formula (8) is covalently linked to a respective one of the bridging groups. Additionally, each starred bond of a given bridging group of formula (8) is covalently linked to a respective one of the hemiaminal groups.

The hemiaminal groups can be bound non-covalently to water and/or a solvent. A non-limiting example is a hemiaminal group that is hydrogen bonded to two water molecules as shown in formula (9):

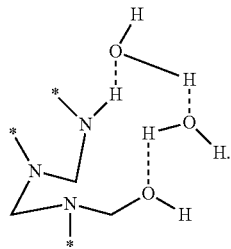

(9)

In an embodiment, a polyhexahydrotriazine (PHT) is a crosslinked polymer comprising i) a plurality of trivalent hexahydrotriazine groups of formula (10):

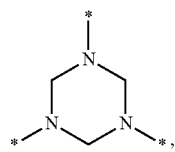

(10)

covalently linked to ii) a plurality of divalent bridging groups K' (y'=2) of formula (2). Each starred bond of a given hexahydrotriazine group of formula (10) is covalently linked to a respective one of the bridging groups K'. Additionally, each starred bond of a given bridging group is covalently linked to a respective one of the hexahydrotriazine groups.

For PHTs comprising bridging groups of formula (6), the polyhexahydrotriazine is represented herein by formula (11):

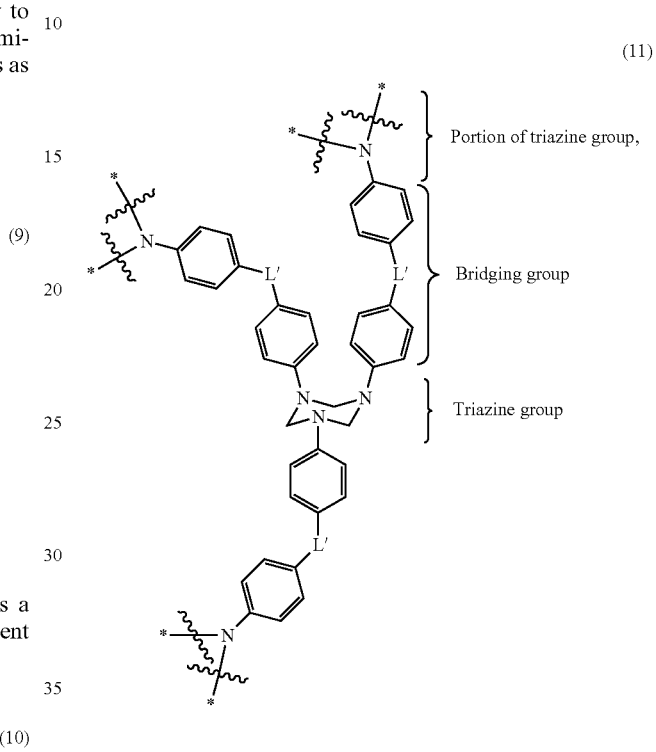

(11)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. Each nitrogen having two starred wavy bonds in formula (11) is a portion of a different hexahydrotriazine group.

The polyhexahydrotriazine is also represented herein by the notation of formula (12):

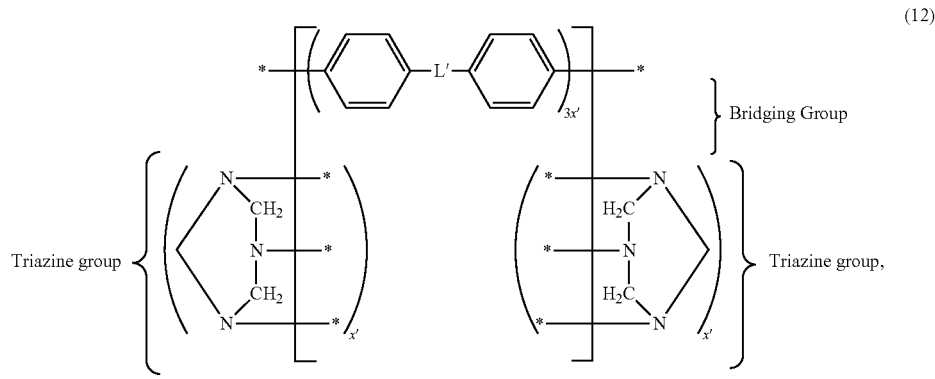

(12)

wherein x' is moles, L' is a divalent linking group selected from the group consisting of *—O—*, *—S—*, *—N(R')—*, *—N(H)—*, *—R"—*, and combinations thereof, wherein R' comprises at least 1 carbon and R" comprises at least one carbon. Each starred bond of a given hexahydrotriazine group of formula (12) is covalently linked to a respective one of the bridging groups. Additionally, each starred bond of a given bridging group of formula (12) is covalently linked to a respective one of the hexahydrotriazine groups.

The polyhexahydrotriazine can be bound non-covalently to water and/or a solvent (e.g., by hydrogen bonds).

Exemplary non-limiting divalent bridging groups include:

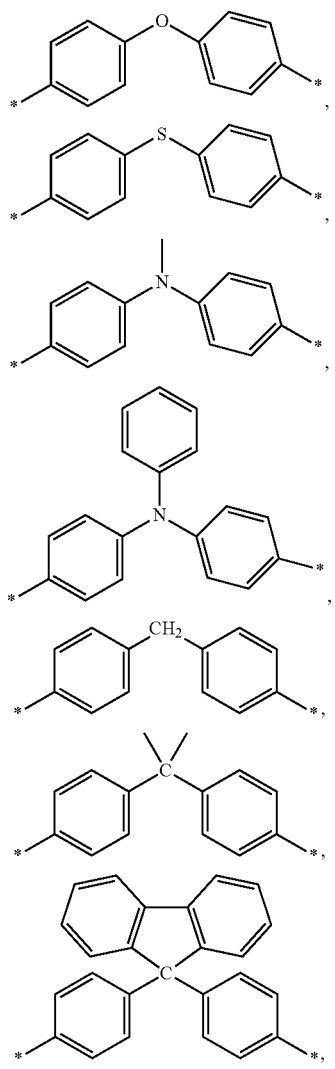

and
combinations thereof.

The PHA and PHT can further comprise monovalent aromatic groups (referred to herein as diluent groups), which do not participate in chemical crosslinking and therefore can serve to control the crosslink density as well as the physical and mechanical properties of the PHA and PHT polymers. Monovalent diluent groups have a structure according to formula (8), formula (9), formula (10), and/or formula (11):

 (8)

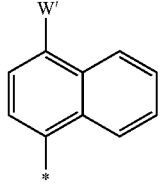 (9)

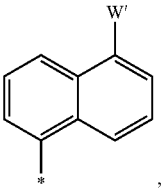 (10)

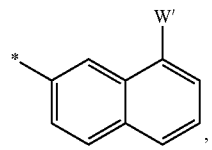 (11)

wherein W' is a monovalent radical selected from the group consisting of *—N(R$^1$)(R$^2$), *—OR$^3$, —SR$^4$, wherein R$^1$, R$^2$, R$^3$, and R$^4$ are independent monovalent radicals comprising at least 1 carbon. The starred bond is linked to a nitrogen of a hemiaminal group or a hexahydrotriazine group.

Non-limiting exemplary diluent groups include:

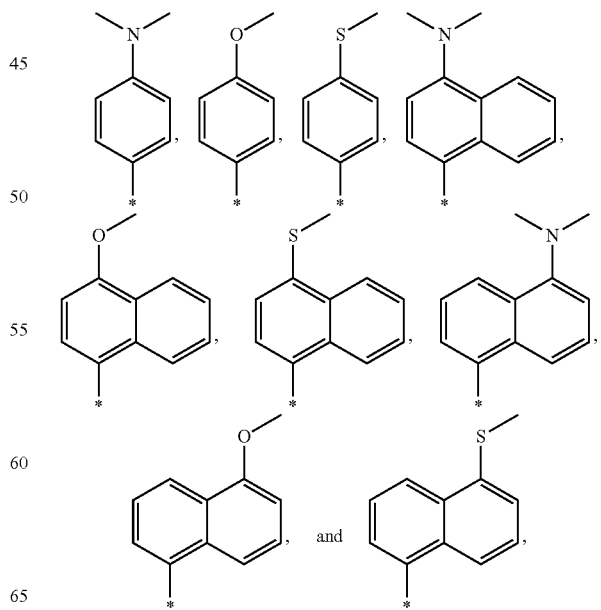

wherein the starred bond is linked to a nitrogen of a hemiaminal group or a hexahydrotriazine group. Diluent groups can be used singularly or in combination.

A method of preparing a polyhemiaminal (PHA) comprising divalent bridging groups comprises forming a first mixture comprising i) a monomer comprising two or more primary aromatic amine groups, ii) an optional diluent monomer comprising one aromatic primary amine group, iii) paraformaldehyde, and iv) a solvent. The first mixture is then preferably heated at a temperature of about 20° C. to about 120° C. for about 1 minute to about 24 hours, thereby forming a second mixture comprising the PHA. In an embodiment, the monomer comprises two primary aromatic amine groups.

The mole ratio of paraformaldehyde: total moles of primary aromatic amine groups (e.g., diamine monomer plus optional monoamine monomer) is preferably about 1:1 to about 1.25:1, based on one mole of paraformaldehyde equal to 30 grams.

Non-limiting exemplary monomers comprising two primary aromatic amine groups include 4,4'-oxydianiline (ODA), 4,4'-methylenedianiline (MDA), 4,4'-(9-fluorenylidene)dianiline (FDA), p-phenylenediamine (PD), 1,5-diaminonaphthalene (15DAN), 1,4-diaminonaphthalene (14DAN), and benzidene, which have the following structures:

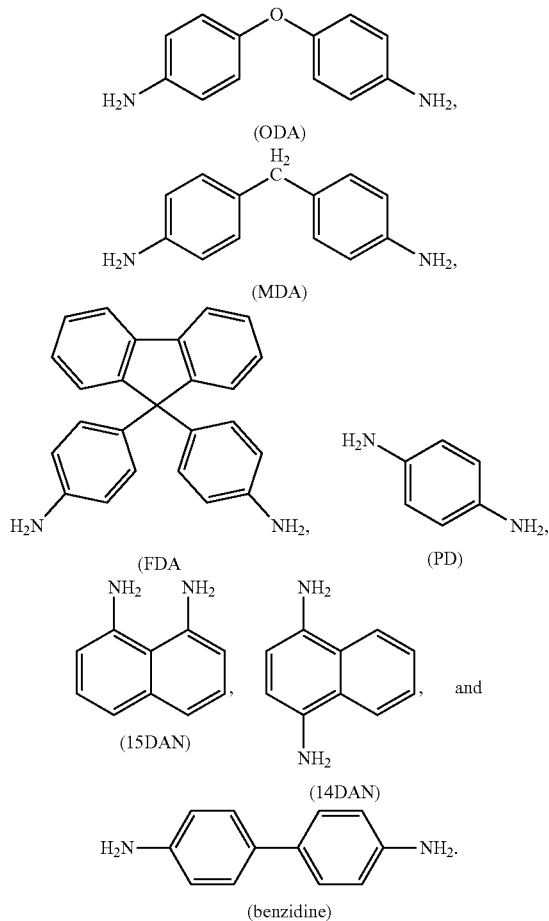

Non-limiting exemplary diluent monomers include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), which have the following structures:

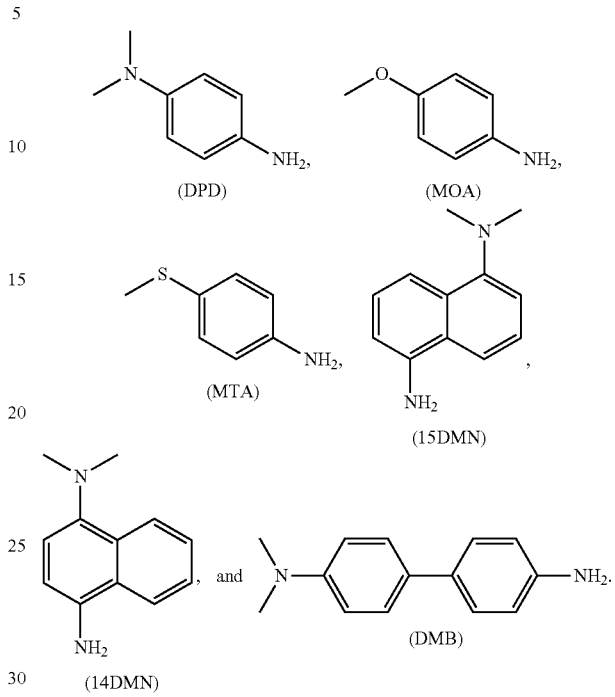

The diluent monomer can be used in an amount of 0 mole % to about 75 mole % based on total moles of monomer and diluent monomer.

The solvent can be any suitable solvent. Preferred solvents include dipolar aprotic solvents such as, for example, N-methyl-2-pyrrolidone (NMP), dimethylsulfoxide (DMSO), N,N-dimethylformamide (DMF), N,N-dimethylacetamide (DMA), Propylene carbonate (PC), and propylene glycol methyl ether acetate (PGMEA). Most preferably, the solvent is NMP.

A method of preparing a polyhexahydrotriazine (PHT) having divalent bridging groups comprises forming a first mixture comprising i) a monomer comprising two aromatic primary amine groups, ii) an optional diluent monomer comprising one aromatic primary amine group, iii) paraformaldehyde, and iv) a solvent, and heating the first mixture at a temperature of at least 150° C., preferably about 165° C. to about 280° C., thereby forming a second mixture comprising a polyhexahydrotriazine. The heating time at any of the above temperatures can be for about 1 minute to about 24 hours.

Alternatively, the PHT can be prepared by heating the solution comprising the PHA at a temperature of at least 150° C., preferably about 165° C. to about 280° C. even more preferably at about 180° C. to about 220° C., and most preferably at about 200° C. for about 1 minute to about 24 hours.

Also disclosed is a method of preparing a polyhemiaminal film, illustrated in the cross-sectional layer diagrams of FIG. 1. A mixture comprising a polyhemiaminal and a solvent prepared as described above is disposed on a surface 12 of a substrate 10, thereby forming structure 20 comprising an initial film layer 22 comprising the polyhemiaminal, solvent and/or water disposed on covered surface 24 of substrate 10. Initial film layer 22 is heated at a temperature of about 20° C. to about 120° C. for about 1 minute to about 24 hours, thereby forming structure 30 comprising polyhemiaminal (PHA) film layer 32 disposed on the covered surface 34 of substrate 10. PHA film layer 22 is substantially free of solvent and/or water.

The substrate can be any suitable substrate, in particular any substrate whose Young's modulus is a factor of 5 greater than the polyhemiaminal and/or polyhexahydrotriazine. Non-limiting examples of these materials include semiconductor wafers (e.g., silicon wafers), most metals, refractory materials, and possibly harder polymers.

The solvent mixture containing the PHA can be cast onto the substrate using any suitable coating technique (e.g., spin coating, dip coating, roll coating, spray coating, and the like).

Figure 2:
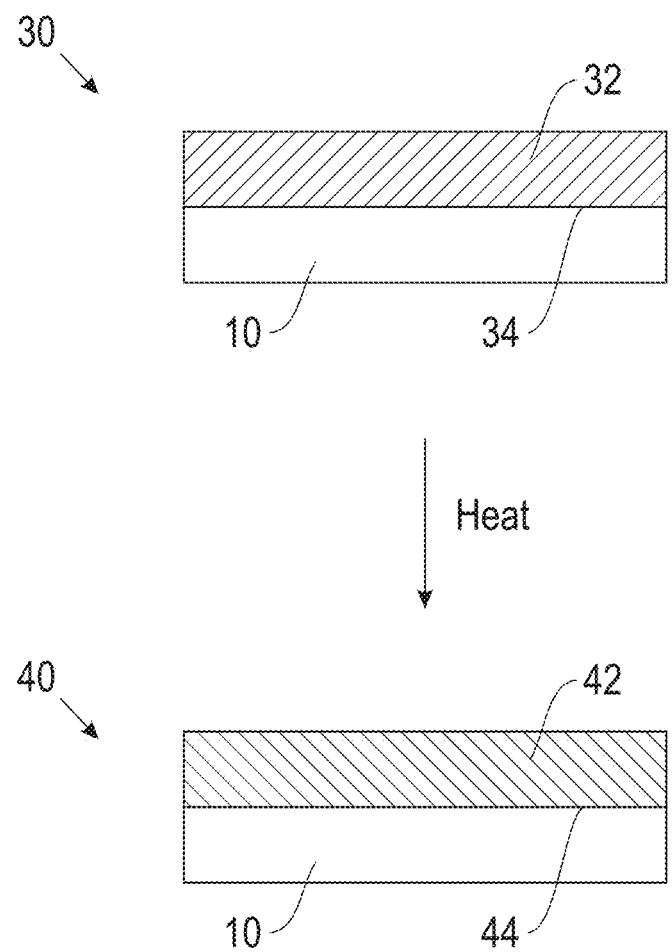
FIG. 2 is a series of cross-sectional layer diagrams illustrating the preparation of a polyhexahydrotriazine (PHT) film.

Also disclosed is a method of preparing a polyhexahydrotriazine (PHT) film from a PHA film, illustrated in the cross-sectional layer diagrams of FIG. 2. The polyhemiaminal film layer 32 of structure 30 can be heated at a temperature of at least 150° C., preferably about 165° C. to about 280° C. even more preferably at about 180° C. to about 220° C., and most preferably at about 200° C., thereby forming structure 40 comprising polyhexahydrotriazine (PHT) film layer 42 disposed on covered surface 44 of substrate 10. The heating time at any of the above temperatures can be about 1 minute to about 24 hours. PHT film layer 42 is substantially free of solvent and water. The hemiaminal groups of the PHA film are substantially or wholly converted to hexahydrotriazine groups by heating the PHA film at a temperature in this range.

The number average molecular weight (Mn) of the PHA and/or PHT polymers can be in a range of 1000 to 100,000, preferably in a range of 1000 to 50,000, and most preferably in a range of 1000 to 20,000.

The polyhexahydrotriazines are attractive for applications requiring lightweight, rigid, strong thermosets such as aerospace engineering, electronics, and as mixtures for increasing the modulus of known resins and composites.

The following examples illustrate the preparation of the PHA and PHT solids and films, and the characterization of their physical properties.

EXAMPLES

Materials used in the following examples are listed in Table 1.

TABLE 1

| ABBREVIATION | DESCRIPTION | SUPPLIER |
|---|---|---|
| PF | Paraformaldehyde | Sigma Aldrich |
| PD | p-Phenylenediamine | Sigma Aldrich |
|  | 4-Å molecular sieves | Sigma Aldrich |
| DMF | Dimethylformamide | Sigma Aldrich |
| PC | Propylene carbonate | Sigma Aldrich |
| NMP | N-Methylpyrollidone | Sigma Aldrich |
| DPD | N,N-dimethyl-p-phenylenediamine | Sigma Aldrich |
| HTPT | Hexahydro-1,3,5-triphenyl-1,3,5-triazine | Prepared below |
| MDA | 4,4'-Methylenedianiline | Sigma Aldrich |
| ODA | 4,4'-Oxydianiline | Sigma Aldrich |
| FDA | 4,4'-(9-fluorenylidene)dianiline, MW 348.4 | Sigma Aldrich |
| PEG-DA | Poly(ethylene glycol) diamine, $H_2N(CH_2CH_2O)_nCH_2CH_2NH_2$; Mn 4.6 kDa | Prepared below |
| HDMA | 1,6-Hexanediamine | Sigma Aldrich |

Herein, Mn is the number average molecular weight, Mw is the weight average molecular weight, and MW is the molecular weight of one molecule.

N-Methyl-2-pyrrolidone (NMP), paraformaldehyde, 4,4'-diaminephenylmethane (MDA), and 4,4'-(9-fluorenylidene) dianiline (FDA) were purchased from Aldrich and used as received. 4,4'-Oxydianiline (ODA) was purchased from Aldrich, rinsed with acetone and dried in an Abderhalden drying pistol overnight prior to use. $d_9$-NMP, $d_6$-DMSO and $CDCl_3$ were purchased from Cambridge Isotope Laboratories (CIL) and used as received. $d_9$-NMP, $d_6$-DMSO and $CDCl_3$ were purchased from Cambridge Isotope Laboratories (CIL) and used as received.

PEG-DA was prepared according to the procedure of D. L. Elbert and J. A. Hubbell, "Conjugate Addition Reactions Combined with Free-Radical Cross-Linking for the Design of Materials for Tissue Engineering," Biomacromolecules 2001, 2, 430-441.

$^1$H NMR spectra were recorded on a Bruker Avance 400 spectrometer (400 MHz). Chemical shifts are reported in ppm from tetramethylsilane with the solvent resonance as the internal standard ($CDCl_3$: delta 7.26 ppm; $d_6$-DMSO: delta 2.50 ppm; $d_9$-NMP: delta 3.23, 2.58, 1.80; $d_6$-acetone: delta 2.05 ppm).

$^{13}$C NMR spectra were recorded on a Bruker Avance 400 spectrometer (100 MHz) spectrometer with complete proton decoupling. Chemical shifts are reported in ppm from tetramethylsilane with the solvent resonance as the internal standard ($CDCl_3$: delta 77.16 ppm; $d_6$-DMSO: delta 39.51). Data are reported as follows: chemical shift, integration, multiplicity (s=singlet, d=doublet, t=triplet, q=quartet, sep=septet, bs=broad singlet, m=multiplet), and coupling constants (Hz).

Infrared (IR) spectra were recorded on a Thermo Nicolet Nexus 670 FT-IR Alpha spectrophotometer using a Nicolet OMNI-Sampler ATR Smart-Accessory, with $v_{max}$ in $cm^{-1}$.

Gel permeation chromatography (GPC) was performed in THF or DMF using a Waters system equipped with four 5-micrometer Waters columns (300 mm×7.7 mm) connected in series with an increasing pore size (100, 1000, $10^5$, $10^6$ Å), a Waters 410 differential refractometer, and a 996 photodiode array detector. The system was calibrated with polystyrene standards.

X-ray diffraction (XRD) profiles were obtained on Bruker D8 Discover diffractometer fitted with a 2D detector. All scans were performed in a symmetric theta-2theta geometry using graphite monochromated Cu-$K_\alpha$ x-rays ($\lambda$=1.5418 Å).

Atomic force microscopy (AFM) images were acquired on commercial instrumentation under ambient conditions in intermittent contact mode ('tapping') at a 1 Hz scan rate with doped silicon cantilevers of spring constant of about 50 N/m.

Cross-polarization (CP) magic-angle-spinning (MAS) $^{13}$C NMR spectra were obtained with a Bruker Avance 500 spectrometer operating at 125.762 MHz and 500.102 MHz for $^{13}$C and $^1$H, respectively. Ramped-amplitude cross polarization and two-pulse phase-modulated (TPPM) $^1$H decoupling were employed. The amplitude of the $^{13}$C spin locking field was ramped from 80 to 100% during the contact time and the $^1$H decoupling field was 119 kHz ($\gamma B_1/2\pi$). The MAS spinning speed was 14 kHz, the contact time was 3 milliseconds, and the relaxation delay was 5 seconds. Spectra were obtained by averaging 16000 scans on 23-30 mg of sample contained in a 4 mm OD Bruker MAS rotor. The $^{13}$C chemical shifts were externally referenced using a rotor containing liquid tetramethylsilane (TMS).

Syntheses

Example 1 (Comparative)

Reaction of aniline with paraformaldehyde to form hexahydrotriazine compound 4,4',4"-(1,3,5-triazinane-1,3,5-triyl)tris(N,N-dimethylaniline) (HTPT).

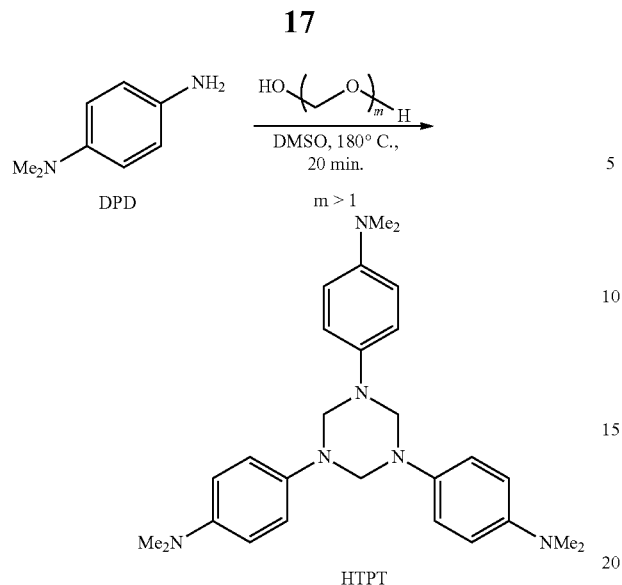

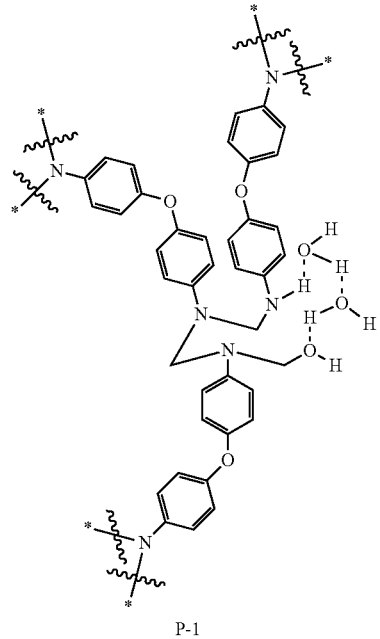

P-1

N,N-dimethyl-p-phenylenediamine (DPD, 0.21 g, 0.15 mmol) and paraformaldehyde (PF, 0.0046 g, 0.15 mmol, 1 equivalent (eq.)) were weighed out into a 2-Dram vial inside a glovebox. DMSO (0.91 g, 1.0 mL) was added. The reaction mixture was removed from the glovebox, and heated in an oil bath at 180° C. for 20 minutes. The DMSO was removed in vacuo and 4,4',4''-(1,3,5-triazinane-1,3,5-triyl)tris(N,N-dimethylaniline) was collected as a brown solid (0.04 g, 79% yield).

Figure 3:
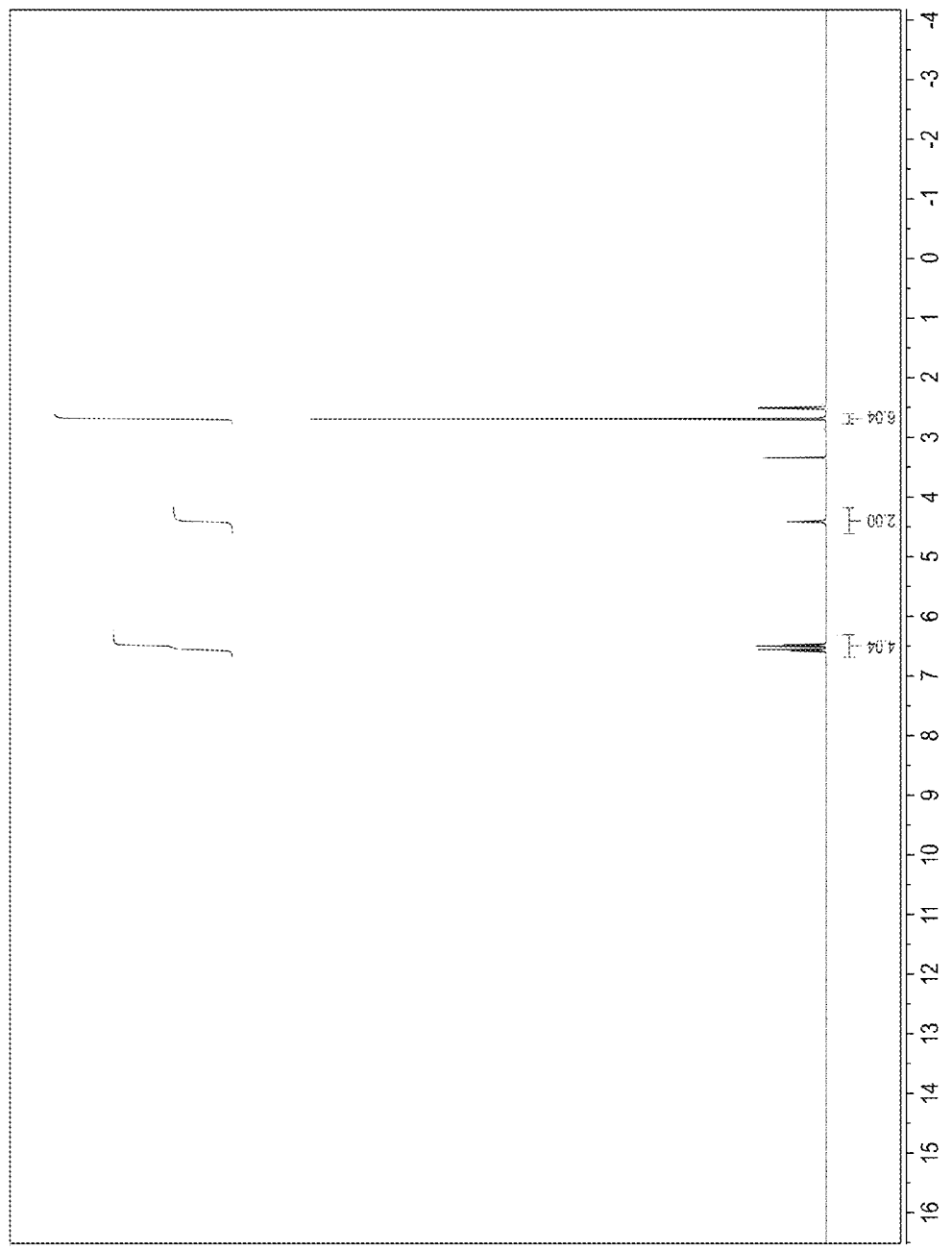
FIG. 3 is a $^1$H NMR spectrum of N,N-dimethyl-p-phenylenediamine in $d_6$-DMSO.
Figure 4:
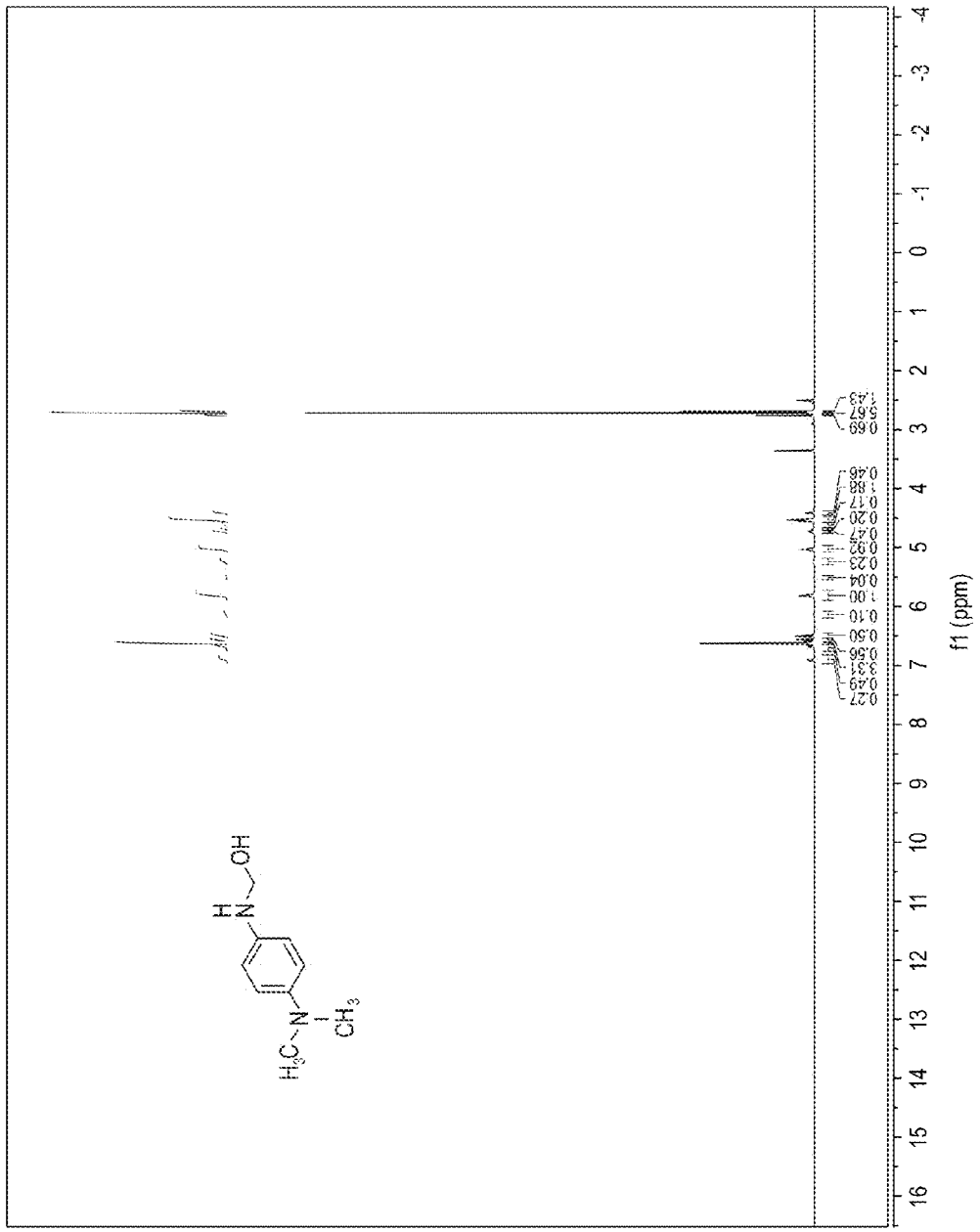
FIG. 4 is a ¹H NMR spectrum of a hemiaminal formed by the reaction of N,N-dimethyl-p-phenylenediamine with paraformaldehyde.
Figure 5:
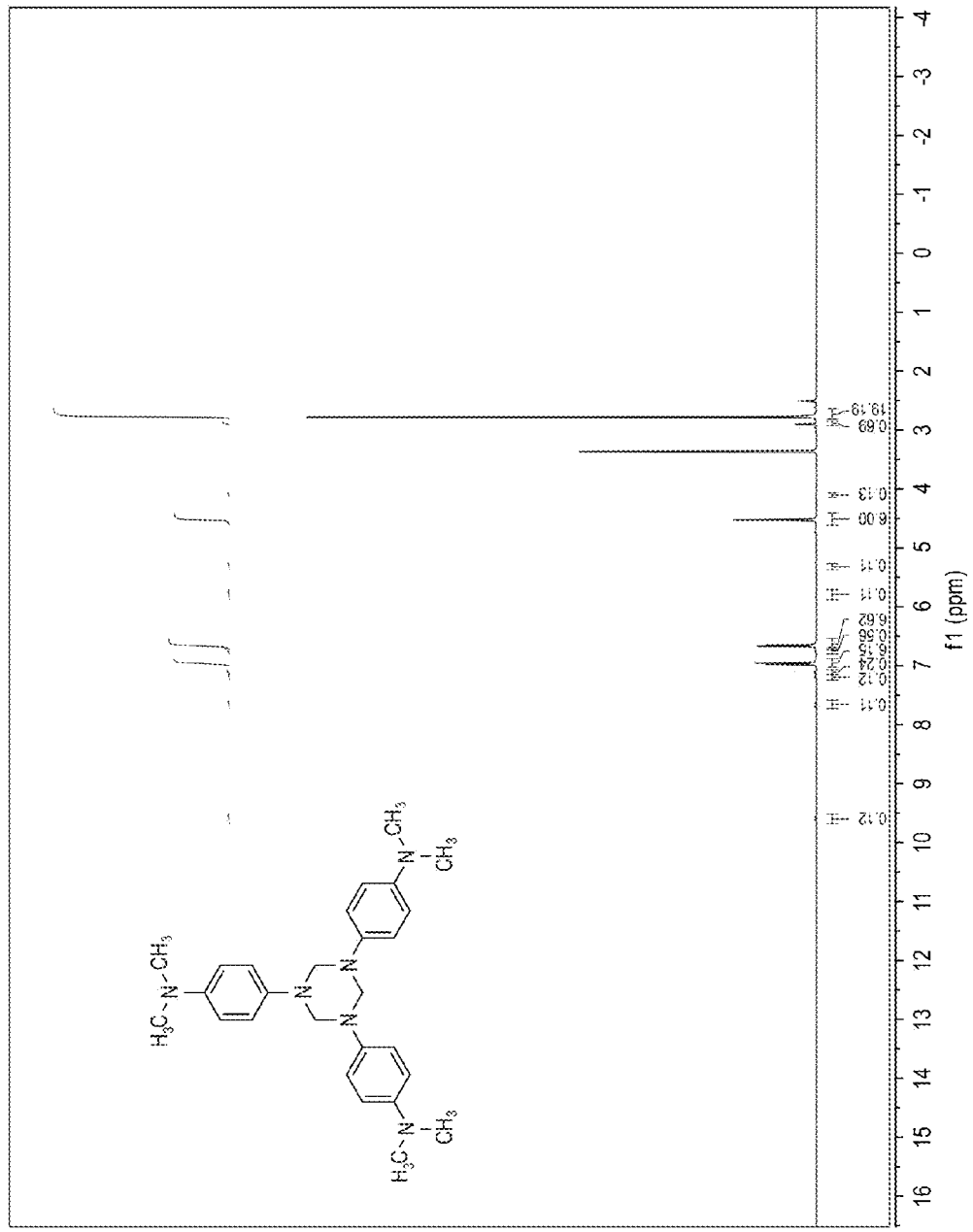
FIG. 5 is a ¹H NMR spectrum of crude 4,4',4"-(1,3,5-triazinane-1,3,5-triyl)tris(N,N-dimethylaniline) formed by the reaction of N,N-dimethyl-p-phenylenediamine with paraformaldehyde (Example 1).

The following procedure was used for a $^1$H NMR time study of hemiaminal formation. DPD (0.021 g, 1.6 mmol (FIG. 3, $^1$H NMR)) and PF (0.0057 g, 1.9 mmol, 1.2 eq.) were carefully weighed into a dried 2-Dram vial with stirbar in the dry box and $d_6$-DMSO (1.0 mL, 1.6 M) was added by syringe. The mixture was transferred to a dried NMR tube and the condensation reaction was monitored over time. At 50° C. (FIG. 4, $^1$H NMR), there are signals corresponding to the formation of hemiaminal, and no hexahydrotriazine is observed. After heating at 180° C., however, >98% conversion to the hexahydrotriazine product HTPT is observed (FIG. 5, $^1$H NMR).

Figure 6:
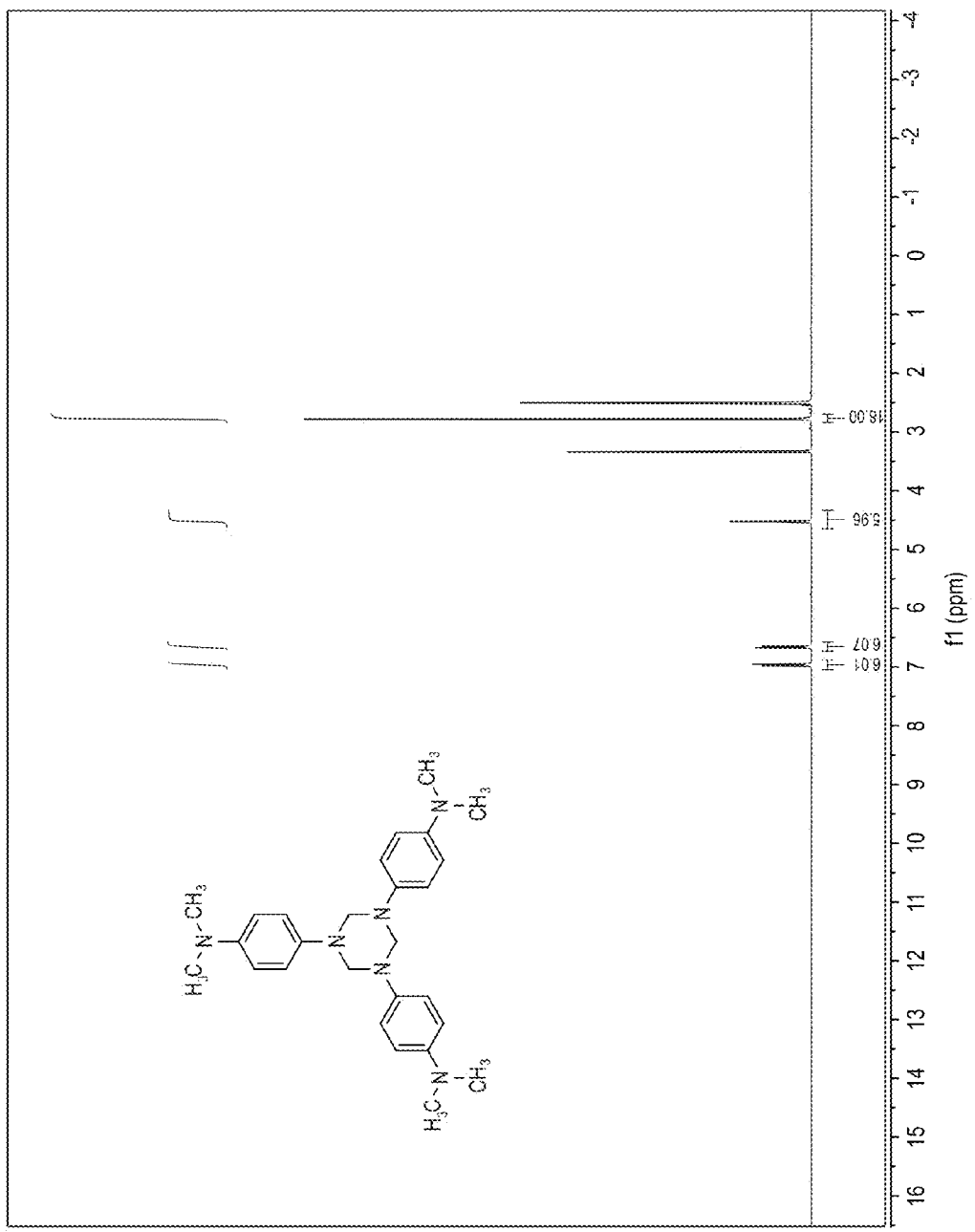
FIG. 6 is a ¹H NMR spectrum of purified 4,4',4"-(1,3,5-triazinane-1,3,5-triyl)tris(N,N-dimethylaniline) formed in Example 1.

The purified HTPT has a singlet resonating at delta 4.5 ppm (FIG. 6, $^1$H NMR spectrum) for the six methylene protons of HTPT. $^1$H NMR ($d_6$-DMSO, 400 MHz): delta 6.97 (d, 2H, J=8 Hz), 6.66 (d, 2H, J=8 Hz), 4.53 (s, 2H), 2.78 (s, 6H) ppm.

Example 2

Preparation of polyhemiaminal P-1 by reaction of 4,4'-oxydianiline (ODA) with paraformaldehyde (PF)

The product is a powder.

Figure 7:
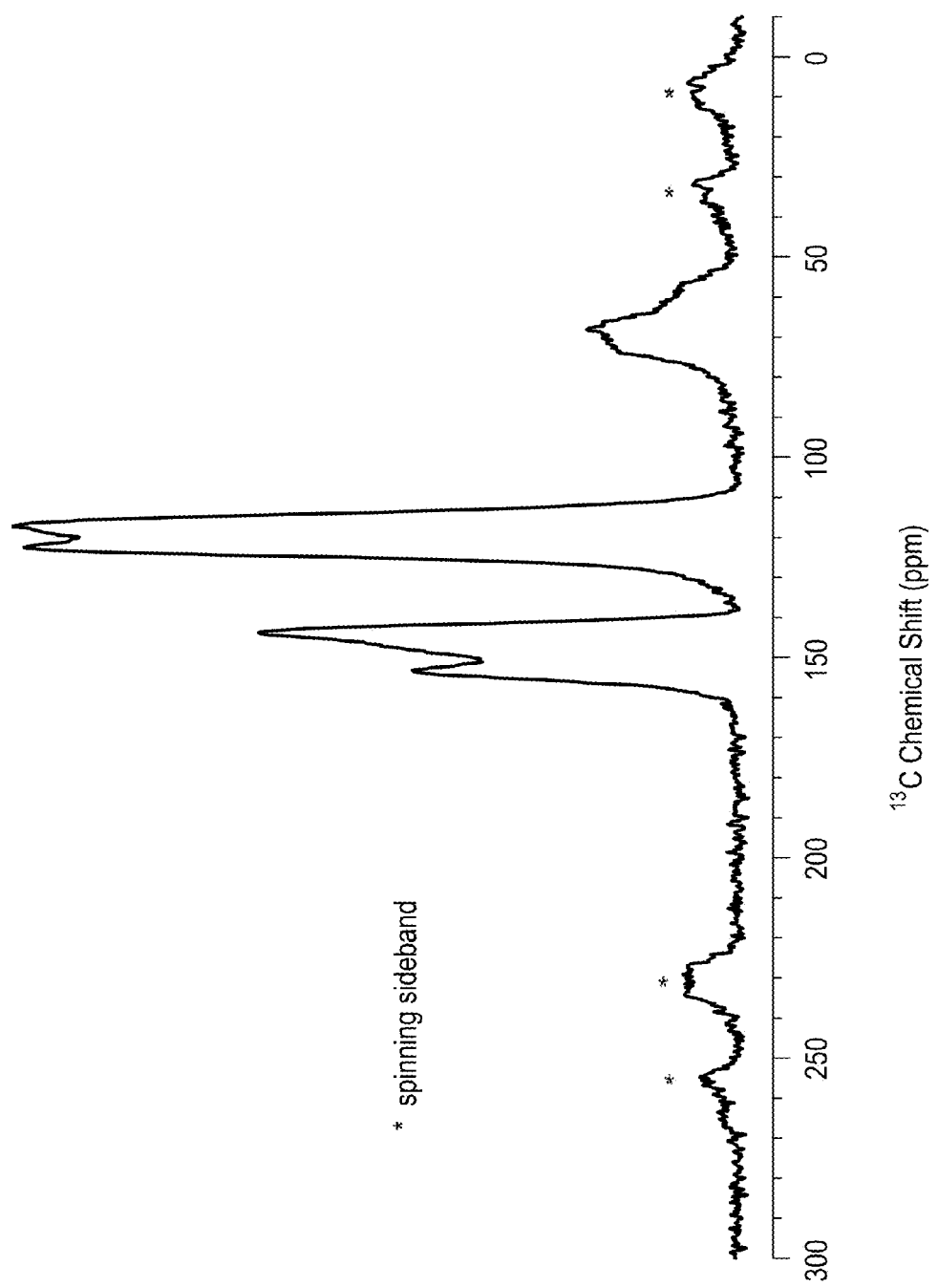
FIG. 7 is a solid state ¹³C NMR spectrum of the polyhemiaminal formed in Example 6.

4,4'-Oxydianiline (ODA, 0.20 g, 1.0 mmol) and paraformaldehyde (PF, 0.15 g, 5.0 mmol, 5 equivalents (eq.)) were weighed out into a 2-Dram vial inside a $N_2$-filled glovebox. N-methylpyrrolidone (NMP, 6.2 g, 6.0 mL) was added (0.17 M). The vial was capped but not sealed. The reaction mixture was removed from the glovebox, and heated in an oil bath at 50° C. for 24 hours (after approximately 0.75 hours, the polymer begins to precipitate in NMP). The polyhemiaminal P-1 was precipitated in acetone or water, filtered and collected to yield 0.22 g, >98% yield as a white solid. $^{13}$C NMR (solid-state): 70, 120, and 145 ppm (FIG. 7).

Example 3

Preparation of Polyhemiaminal P-2

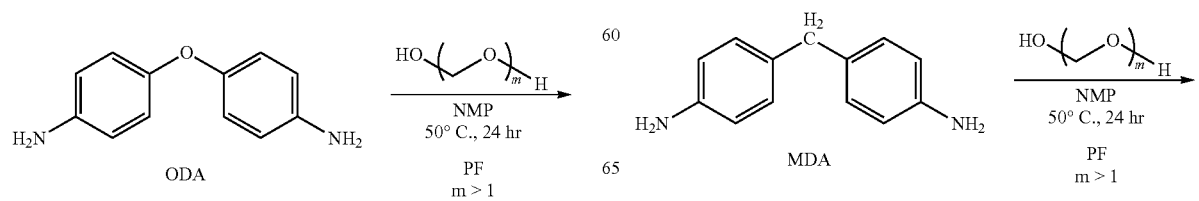

19
-continued

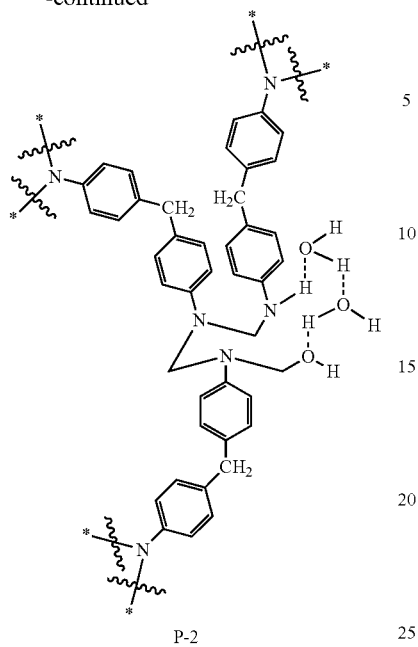

P-2

P-2 was prepared according to the preparation of P-1 (Example 1) substituting ODA with 4,4'-methylenedianiline (MDA) and using an MDA:PF mole ratio of 1:5. Isolated 0.15 g, 69% yield of an amorphous, insoluble off-white powder. IR (KBr pellet) $v_{max}$: 3441 (br s), 2950 (w), 2931 (w), 2885 (w), 1665 (s), 1507 (m), 1475 (w), 1427 (w), 1406 (w), 1301 (m), 1264 (w), 1228 (w), 1115 (w), 1026 (w), 987 (w), 659 (w) cm$^{-1}$.

Example 4

Preparation of Polyhemiaminal P-3

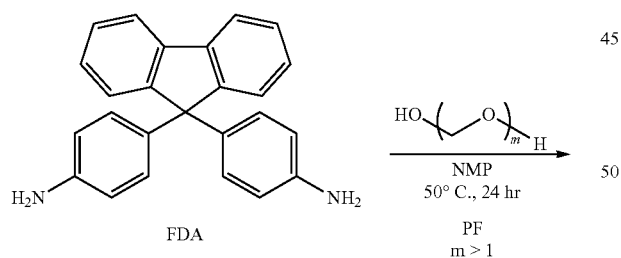

20
-continued

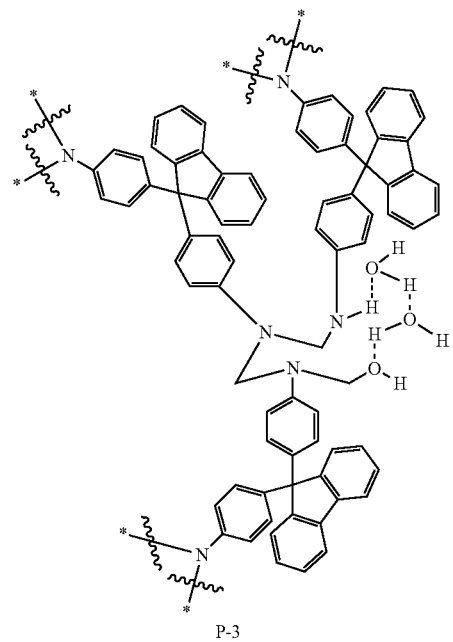

P-3

P-3 was prepared according to the preparation of P-1 (Example 1) substituting ODA with 4,4'-(9-fluorenylidene)dianiline (FDA) and using an FDA:PF mole ratio of 1:5. Isolated 0.26 g, 76% yield of an amorphous, insoluble white powder. IR (KBr pellet) $v_{max}$: 3442 (br s), 3063 (br w), 2955 (br w), 1659 (m), 1608 (m), 1502 (m), 1445 (w), 1384 (w), 1012 (w), 814 (w), 741 (w) cm$^{-1}$.

Example 5

Preparation of Polymer P-4

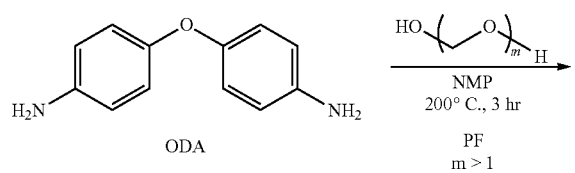

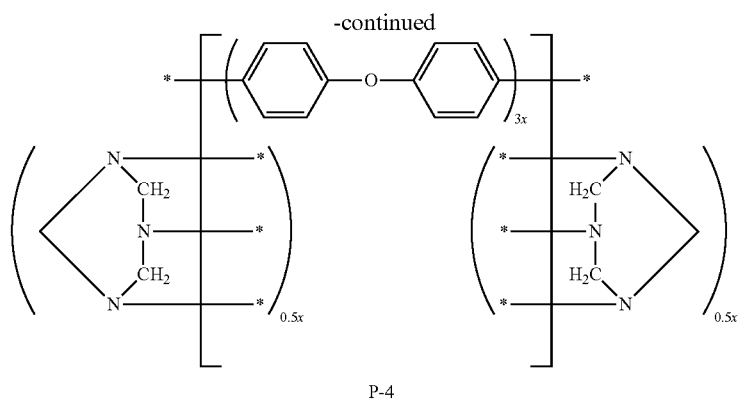

P-4

P-4, a polyhexahydrotriazine, was prepared by reaction of 4,4'-oxydianiline (ODA) with paraformaldehyde (PF). ODA (0.20 g, 1.0 mmol) and PF (0.15 g, 5.0 mmol, 2.5 eq.) were weighed out into a 2-Dram vial inside a $N_2$-filled glovebox. NMP (6.2 g, 6.0 mL, 0.17 M) was added. The reaction mixture was removed from the glovebox, and heated in an oil bath at 200° C. for 3 hours (after approximately 0.25 hours, the polymer begins to gel in the NMP). The solution was allowed to cool to room temperature and the polymer was precipitated in 40 mL of acetone, allowed to soak for 12 hours, then filtered and dried in a vacuum oven overnight and collected to yield 0.21 g, 95% yield of P-4 as an off-white solid.

Table 2 summarizes the above polyhemiaminal (PHA) and polyhexahydrotriazine (PHT) preparations that were isolated as solids.

TABLE 2

| Example | Name | Monomer Name | (g) | (mmol) | PF (g) | (mmol) | Monomer:PF (mole ratio) | Solvent | Reaction Conditions | Polymer Type[a] | Description |
|---|---|---|---|---|---|---|---|---|---|---|---|
| 2 | P-1 | ODA | 0.200 | 1.0 | 0.150 | 5.0 | 1:5 | NMP | 50° C., 24 hrs | PHA | white solid |
| 3 | P-2 | MDA | 0.198 | 1.0 | 0.150 | 5.0 | 1:5 | NMP | 50° C., 24 hrs | PHA | off-white solid |
| 4 | P-3 | FDA | 0.348 | 1.0 | 0.150 | 5.0 | 1:5 | NMP | 50° C., 24 hrs | PHA | white solid |
| 5 | P-4 | ODA | 0.200 | 1.0 | 0.150 | 5.0 | 1:5 | NMP | 200° C., 3 hrs | PHT | off-white solid |

[a]PHA = polyhemiaminal, PHT = polyhexahydrotriazine

Film Preparations
Polyhemiaminal (PHA) Films

Example 6

Preparation of polyhemiaminal film PHA-1. 4,4'-Oxydianiline (ODA, 0.400 g, 2.0 mmol) and paraformaldehyde (PF, 0.300 g, 10.0 mmol, 5 eq.) were weighed into a 2-Dram vial with equipped with a stirbar. NMP (6 mL, 0.33 M with respect to ODA) was added to the vial under nitrogen. The vial was capped but not sealed. The solution was stirred at 50° C. for 30 minutes (time sufficient to form soluble oligomers in NMP). The clear and colorless solution was then filtered through a nylon syringe filter (0.45 micrometers) onto a glass plate with aluminum tape (80 micrometers thickness) boundaries. The film was cured at 50° C. for 24 hours. The clear and colorless polyhemiaminal film was then carefully peeled from the glass plate using a razor blade. IR (film), $v_{max}$ ($cm^{-1}$): 3389 (br s), 3031 (m), 2871 (m), 1863 (w), 1667 (s), 1609 (s), 1471 (s), 1404 (m), 1304 (m), 1297 (s), 1128 (m), 1078 (m), 1007 (m), 871 (m), 821 (s), 511 (m).

Example 7

Preparation of polyhemiaminal film PHA-2. PHA-2 was prepared according to Example 6 using an ODA:PF mole ratio of 1:6.7.

Example 8

Preparation of polyhemiaminal film PHA-3. PHA-3 was prepared according to Example 6 using an ODA:PF mole ratio of 1:10.

Example 9

Preparation of polyhemiaminal film PHA-4. PHA-4 was prepared according to Example 6, substituting ODA with 4,4'-methylenedianiline (MDA) and using an MDA:PF mole ratio of 1:5.

Example 10

Preparation of polyhemiaminal film PHA-5. PHA-5 was prepared according to Example 6, substituting ODA with 4,4'-fluorenylidenedianiline (FDA) and using an FDA:PF mole ratio of 1:5.

Example 11

Attempted preparation of polyhemiaminal film PHA-6.

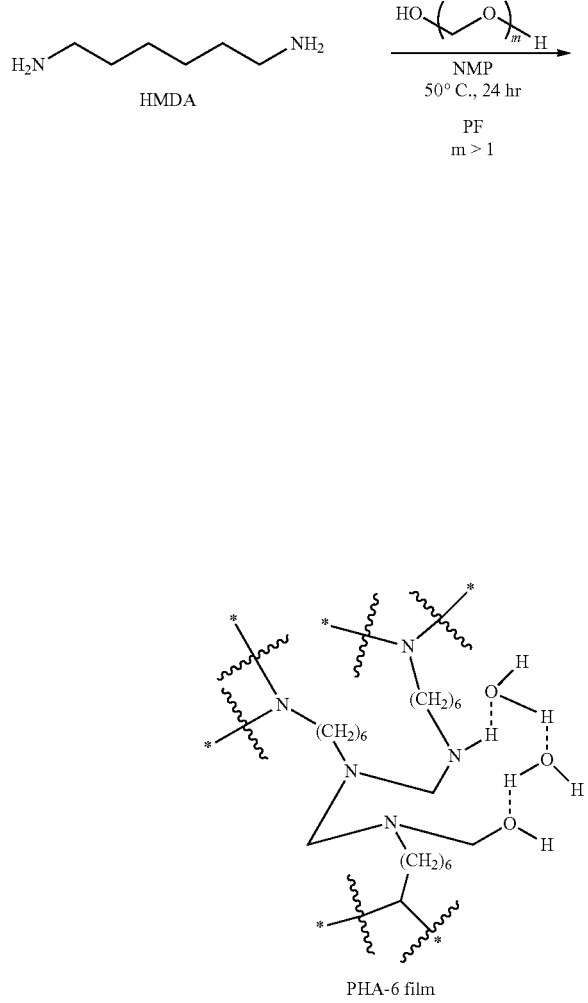

PHA-6 film

PHA-6 was prepared according to Example 6, substituting ODA with 1,6-hexanediamine (HDMA) and using an HDMA:PF mole ratio of 1:5. A continuous, regular film was not obtained. Instead small pieces of polymer were removed from the glass with a razor blade.

Example 12

Preparation of Polyhemiaminal Film PHA-7

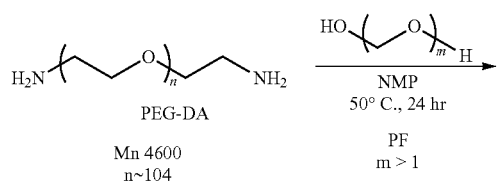

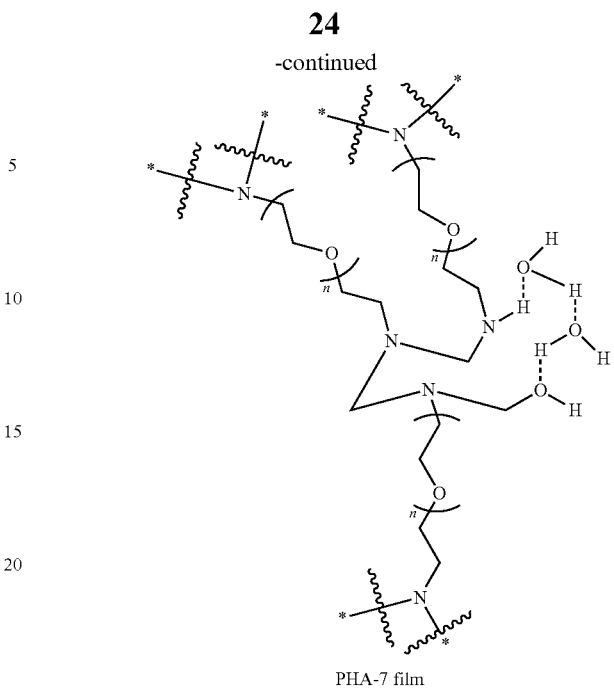

PHA-7 film

PHA-7 was prepared according to Example 6, substituting ODA with poly(ethylene glycol) diamine (PEG-DA) and using an PEG-DA:PF mole ratio of 1:5.

Polyhexahydrotriazine (PHT) Films

Example 13

Preparation of polyhexahydrotriazine film PHT-1. ODA (0.400 g, 2.0 mmol) and PF (0.150 g, 5.0 mmol, 2.5 equiv) were weighed into a 2-Dram vial equipped with a stirbar. NMP (6 mL, 0.33 M with respect to ODA) was added to the vial under nitrogen and the vial was capped. The vial was not sealed. The solution was allowed to stir at 50° C. for 30 minutes (time sufficient for solubility of reagents in NMP). The clear and colorless solution was then filtered through a nylon syringe filter (0.45 micrometer) onto a leveled glass plate with aluminum tape (80 micrometers thickness) boundaries and allowed to cure according to the following ramping procedure: 22° C. to 50° C. over 1 hour; then 50° C. to 200° C. over 1 hour, and hold at 200° C. for 1 hour. The yellow film was then carefully peeled from the glass plate using a razor blade. IR (film), $v_{max}$ (cm$^{-1}$): 3042 (w), 2815 (w), 1679 (w), 1495 (s), 1385 (w), 1211 (s), 1111 (w), 985 (w), 936 (w), 871 (w), 826 (w).

Example 14

Preparation of polyhexahydrotriazine film PHT-2. PHT-2 was prepared according to Example 13 using an ODA:PF mole ratio of 1:5.

Example 15

Preparation of polyhexahydrotriazine film PHT-3. PHT-3 was prepared according to Example 13 using an ODA:PF mole ratio of 1:10.

Example 16

Preparation of polyhexahydrotriazine film PHT-4. PHT-4 was prepared according to Example 13, substituting NMP with propylene carbonate (PC). The film adhered strongly to the glass plate. Attempted separation of the film using a razor blade produced powder scrapings.

Example 17

Preparation of polyhexahydrotriazine film PHT-5. PHT-5 was prepared according to Example 13, substituting ODA with 4,4'-methylenedianiline (MDA) and using an MDA:PF mole ratio of 1:2.5.

Example 18

Preparation of polyhexahydrotriazine film PHT-5. PHT-5 was prepared according to Example 13, substituting ODA with 4,4'-fluorenylidenedianiline (FDA) and using an FDA:PF mole ratio of 1:2.5.

Example 19

Attempted preparation of polyhexahydrotriazine film PHT-6. PHT-6 was prepared according to Example 13, substituting ODA with 1,6-hexanediamine (HDMA) and using an HDMA:PF mole ratio of 1:2.5. No continuous film was formed. Small pieces of polymer were removed from the glass plate with a razor blade.

Examples 20

Attempted preparation of polyhexahydrotriazine film PHT-7. PHT-7 was prepared according to Example 13, substituting ODA with poly(ethylene glycol) diamine (PEG-DA) and using an PEG-DA:PF mole ratio of 1:2.5. It appeared as though some of the PEG-DA had remained on the glass melted. No PHT or film was obtained.

Table 3 summarizes the above polyhemiaminal (PHA) and polyhexahydrotriazine (PHT) film preparations.

TABLE 3

| Example | Name | Monomer Name | (g) | (mmol) | PF (g) | (mmol) | Monomer:PF (mole ratio) | Solvent | Cure Conditions | Description |
|---|---|---|---|---|---|---|---|---|---|---|
| 6 | PHA-1 | ODA | 0.200 | 1.0 | 0.150 | 5.0 | 1:5 | NMP | 50° C., 24 hrs | Clear and colorless |
| 7 | PHA-2 | ODA | 0.200 | 1.0 | 0.225 | 7.5 | 1:6.7 | NMP | 50° C., 24 hrs | Clear and colorless |
| 8 | PHA-3 | ODA | 0.200 | 1.0 | 0.300 | 10 | 1:10 | NMP | 50° C., 24 hrs | Clear and colorless |
| 9 | PHA-4 | MDA | 0.198 | 1.0 | 0.150 | 5.0 | 1:5 | NMP | 50° C., 24 hrs | Clear and light yellow |
| 10 | PHA-5 | FDA | 0.348 | 1.0 | 0.150 | 5.0 | 1:5 | NMP | 50° C., 24 hrs | Clear and colorless |
| 11 | PHA-6 | HMDA | 0.116 | 1.0 | 0.150 | 5.0 | 1:5 | NMP | 50° C., 24 hrs | no film |
| 12 | PHA-7 | PEG-DA | 0.460 | 0.1 | 0.015 | 0.5 | 1:5 | NMP | 50° C., 24 hrs | Cloudy and colorless, elastic |
| 13 | PHT-1 | ODA | 0.400 | 2.0 | 0.300 | 5.0 | 1:2.5 | NMP | 50° C., 1 hr; ramp 50-200° C. over 1 hr; 200° C. 1 hr | Clear and light yellow/orange |
| 14 | PHT-2 | ODA | 0.400 | 2.0 | 0.450 | 10.0 | 1:5 | NMP | 50° C., 1 hr; ramp 50-200° C. over 1 hr; 200° C. 1 hr | Clear and yellow/orange |
| 15 | PHT-3 | ODA | 0.400 | 2.0 | 0.600 | 20.0 | 1:10 | NMP | 50° C., 1 hr; ramp 50-200° C. over 1 hr; 200° C. 1 hr | Clear and dark orange, with some lighter patches |
| 16 | PHT-4 | ODA | 0.200 | 1.0 | 0.75 | 2.5 | 1:2.5 | PC | 50° C., 1 hr; ramp 50-200° C. over 1 hr; 200° C. 1 hr | Brown and brittle |
| 17 | PHT-5 | MDA | 0.198 | 1.0 | 0.075 | 2.5 | 1:2.5 | NMP | 50° C., 1 hr; ramp 50-200° C. over 1 hr; 200° C. 1 hr | Clear and yellow film |
| 18 | PHT-6 | FDA | 0.348 | 1.0 | 0.075 | 2.5 | 1:2.5 | NMP | 50° C., 1 hr; ramp 50-200° C. over 1 hr; 200° C. 1 hr | Clear and colorless film, somewhat brittle |
| 19 | PHT-7 | HMDA | 0.116 | 1.0 | 0.075 | 2.5 | 1:2.5 | NMP | 50° C., 1 hr; ramp 50-200° C. over 1 hr; 200° C. 1 hr | no film |
| 20 | PHT-8 | PEG-DA | 0.460 | 0.1 | 0.0075 | 0.25 | 1:2.5 | NMP | 50° C., 1 hr; ramp 50-200° C. over 1 hr; 200° C. 1 hr | no film |

Table 4 summarizes the swelling characteristics of the PHA and PHT films determined in NMP, aqueous sulfuric acid solution, saturated sodium bicarbonate solution, and 35% aqueous hydrogen peroxide solution.

Thermal Analysis of Films Cured at Various Temperatures.

Table 5 summarizes the Tg, storage modulus, and temperature for 5% mass loss of the films formed. Tg was measured using dynamic mechanical analysis (DMA) and/or differen-

TABLE 4

| | | | | | | % Swelling of Film In NMP and Aqueous Solutions | | | |
|---|---|---|---|---|---|---|---|---|---|
| Example | Film | Monomer | Monomer:PF (mole ratio) | Cure Conditions[a] | Film Forming? | NMP | 0.5M $H_2SO_4$ (pH 0) | $NaHCO_3$ (pH 11) | 35% $H_2O_2$ |
| 6 | PHA-1 | ODA | 1:5 | 1 | Yes | 1 | decomp | −2.00 | decomp |
| 7 | PHA-2 | ODA | 1:6.7 | 1 | Yes | −10 | decomp | −0.20 | decomp |
| 8 | PHA-3 | ODA | 1:10 | 1 | Yes | 8 | decomp | −0.90 | decomp |
| 9 | PHA-4 | MDA | 1:5 | 1 | Yes | | | | |
| 10 | PHA-5 | FDA | 1:5 | 1 | Yes | | | | |
| 11 | PHA-6 | HMDA | 1:5 | 1 | No | | | | |
| 12 | PHA-7 | PEG-DA | 1:5 | 1 | Yes | | Film dissolves in water | | |
| 13 | PHT-1 | ODA | 1:2.5 | 2 | Yes | 0.03 | decomp | −0.50 | 0.40 |
| 14 | PHT-2 | ODA | 1:5 | 2 | Yes | 1.9 | −56 | 2.40 | 9.20 |
| 15 | PHT-3 | ODA | 1:10 | 2 | Yes | 0.20 | decomp | −3.20 | −0.40 |
| 16 | PHT-4 | ODA | 1:2.5 | 3 | Yes | | decomp | | |
| 17 | PHT-5 | MDA | 1:2.5 | 2 | Yes | | | | |
| 18 | PHT-6 | FDA | 1:2.5 | 2 | Yes | | | | |
| 19 | PHT-7 | HMDA | 1:2.5 | 2 | No | | | | |
| 20 | PHT-8 | PEG-DA | 1:2.5 | 2 | No | | | | |

[a]1 = solvent was NMP, 50° C. for 24 hours;
2 = solvent was NMP, 50° C. for 1 hour; ramp 50-200° C. over 1 hour, 200° C. for 1 hour;
3 = solvent was PC, 50° C. for 1 hour, ramp 50-200° C. over 1 hour, 200° C. for 1 hour.

Acid Treatment of Polyhexahydrotriazine Film and ODA Recovery

A 0.050-g sample of PHT-1 film was exposed to 20-mL of 0.5 M $H_2SO_4$ (pH=0) for 36 hours until complete disintegration had occurred. The solution was neutralized with sodium bicarbonate until the pH was deemed to be approximately 7.0 (by testing with pH strip). A precipitate formed in the solution, which was isolated by filtration to yield 40.0 mg of recovered ODA starting material as a white powder. $^1$H NMR spectra match previously reported values. Notably, a 15.7-mg sample in a saturated $NH_4Cl$ pH=5.5 solution showed no decomposition after 24 hours.

tial scanning calorimetry (DSC) following treatment of the sample using one of two procedures A and/or B. In procedure A, data was collected on a sample heated to 50° C. and analyzed directly. In procedure B, data was collected after holding the sample at 200° C. or one hour. Temperature for 5% mass loss was determined by thermogravimetric analysis (TGA) following treatment of the sample using procedures A or B. For examples that did not form continuous films, the Tg was measured on pieces of polymer obtained from scrapings of the polymer from the glass plate using a razor blade.

TABLE 5

| Example | Film | Monomer | Monomer:PF (mole ratio) | Cure Conditions[a] | Film Forming? | Tg by DMA (° C.)[b] | Tg by DSC (° C.)[c] | Storage Modulus by DMA (GPa) | Temp for 5% mass loss (° C.)[d] | Temp for 5% mass loss (° C.)[e] |
|---|---|---|---|---|---|---|---|---|---|---|
| 6 | PHA-1 | ODA | 1:5 | 1 | Yes | 115 (A) | 125 (A) 222.27 (B) | 0.1 | 165 | 238 |
| 7 | PHA-2 | ODA | 1:6.7 | 1 | Yes | 100 (A) | 220.12 (B) | 0.2 | 200 | 294 |
| 8 | PHA-3 | ODA | 1:10 | 1 | Yes | 210 (A) | 73.43 (B) | 0.75 | 150 | 284 |
| 9 | PHA-4 | MDA | 1:5 | 1 | Yes | 120 (A) | 125.6 (A) | 2.2 | 165.5 | |
| 10 | PHA-5 | FDA | 1:5 | 1 | Yes | | 75 (A) | | 112.5 | |
| 11 | PHA-6 | HMDA | 1:5 | 1 | No | | 173.28 (A) | | 167 | |
| 12 | PHA-7 | PEG-DA | 1:5 | 1 | Yes | | 49.04 (A) | 0.7 | 350 | |
| 13 | PHT-1 | ODA | 1:2.5 | 2 | Yes | 192 (A) | 193 (A) | 3.8 | 238 | |
| 14 | PHT-2 | ODA | 1:5 | 2 | Yes | 207.2 (A) | 217.58 (A) | 3.25 | 275 | |
| 15 | PHT-3 | ODA | 1:10 | 2 | Yes | 218 (A) | 200.35 (A) | 0.9 | 238 | |

TABLE 5-continued

| Example | Film | Monomer | Monomer:PF (mole ratio) | Cure Conditions[a] | Film Forming? | Tg by DMA (° C.)[b] | Tg by DSC (° C.)[c] | Storage Modulus by DMA (GPa) | Temp for 5% mass loss (° C.)[d] | Temp for 5% mass loss (° C.)[e] |
|---|---|---|---|---|---|---|---|---|---|---|
| 16 | PHT-4 | ODA | 1:2.5 | 3 | Yes | | 146.95 (A) | | 180 | |
| 17 | PHT-5 | MDA | 1:2.5 | 2 | Yes | 227 (A) | | 2.4 | 250 | |
| 18 | PHT-6 | FDA | 1:2.5 | 2 | Yes | 229.17 (A) | | 3.0 | 150 | |
| 19 | PHT-7 | HMDA | 1:2.5 | 2 | No | | 55.51 (A) | | 150 | |
| 20 | PHT-8 | PEG-DA | 1:2.5 | 2 | No | | | | | |

Figure 8:
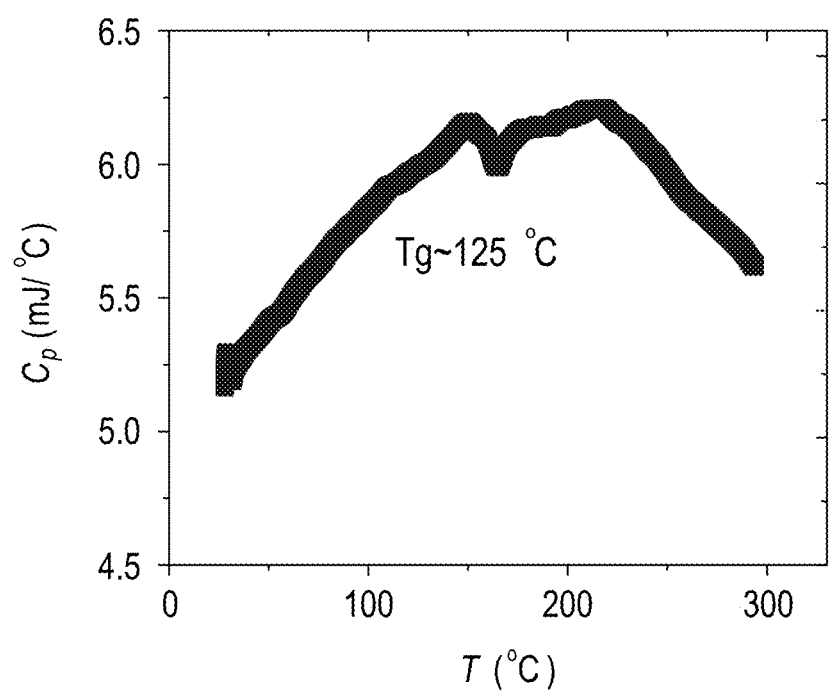
FIG. 8 is a differential scanning calorimetry (DSC) scan for the polyhemiaminal film of PHA-1 (Example 6) after curing at 50° C. The glass transition temperature (Tg) is 125° C.
Figure 9:
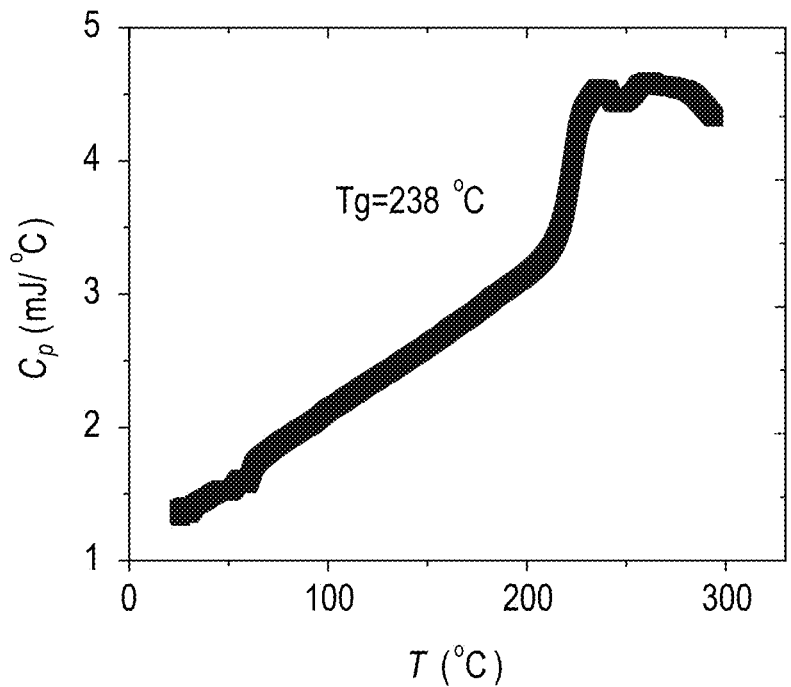
FIG. 9 is a DSC scan of the polyhemiaminal film PHA-1 (Example 6) cured at 50° C., then heated to 200° C. for 1 hour prior to the analysis. The glass transition temperature (Tg) is 222.27° C.

[a]1 = solvent was NMP, 50° C. for 24 hours;
2 = solvent was NMP, 50° C. for 1 hour; ramp 50-200° C. over 1 hour, 200° C. for 1 hour;
3 = solvent was PC, 50° C. for 1 hour, ramp 50-200° C. over 1 hour, 200° C. for 1 hour.
[b]Tg = glass transition temperature obtained by dynamic mechanical analysis (DMA); Codes A and B represent the following: A = data collected on a run heated to 50° C. and analyzed directly, B = data obtained after holding sample at 200° C. or one hour
[c]Tg obtained by differential scanning calorimetry (DSC); Codes A and B represent the following: A = data collected on a run heated to 50° C. and analyzed directly, B = data obtained after holding sample at 200° C. or one hour
[d]Determined by thermogravimetric analysis (TGA); data collected on a run heated to 50° C. and analyzed directly
[e]Determined by thermogravimetric analysis (TGA); data obtained after holding sample at 200° C. or one hour The glass transition temperatures (Tg) of polyhemiaminal (PHA) films given different thermal treatments were evaluated through DMA and DSC. In the first scan of PHA-1 (Example 6) cured at 50° C. with no subsequent higher heat treatment, the observed Tg was about 125° C. by DSC (FIG. 8, graph), which is notably higher than the cure temperature (50° C.). When the sample was cured at 50° C., then heated at 200° C. for one hour prior to analysis, the Tg increased to 222.27° C. by DSC (FIG. 9, graph). The increase in Tg is likely due to a chemical transformation taking place at higher temperature (i.e., the transition from polyhemiaminal to polyhexahydrotriazine).

Figure 10:
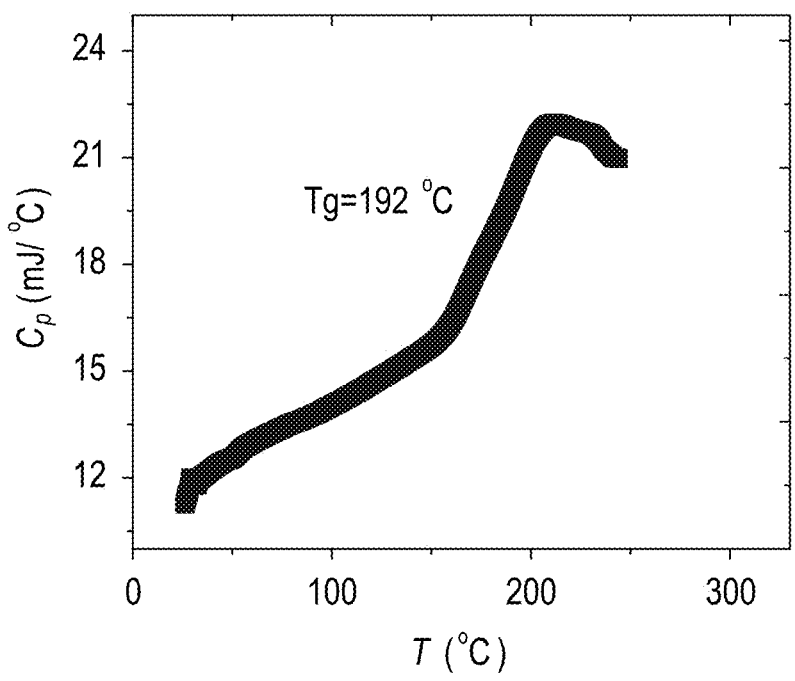
FIG. 10 is a DSC scan of the polyhexahydrotriazine film PHT-1 (Example 13), which was cured at 200° C. for 1 hour prior to the analysis. The glass transition temperature (Tg) is about 192° C., close to the curing temperature.

The first DSC scan of the PHT-1 film (Example 13) is shown in FIG. 10. The Tg (192° C.) is close to the curing temperature (200° C.).

Determination of Mass Lost During Polyhemiaminal Heating

A colorless polyhemiaminal film (0.138 g) formed with 4,4'-oxydianiline (ODA) and cured at 50° C. was placed in a capped 5-Dram glass vial under $N_2$ and sealed with Teflon tape. The vial was submerged halfway into a sand bath heated at 200° C. for 24 hours. The vial was then removed from the heat, allowed to cool to room temperature, and brought into a nitrogen filled glovebox. Soluble condensates that formed on the upper portion of the vial were rinsed with 2-5 mL portions of dry $d_6$-acetone (<5% $H_2O$ by $^1$H NMR analysis after drying over 4 Å molecular sieves for 24 hours), transferred to an oven-dried NMR tube, and 1 microliter of anhydrous benzene as an internal standard was added to the NMR tube. The remaining brown film was removed from the vial and weighed (0.0657 g, lost 52% of original mass). Yields determined by $^1$H NMR analysis of NMP and water were 0.0271 g (0.273 mmol) and 0.0106 g (0.588 mmol) respectively, accounting for 52% of the total mass lost during heating. The remaining 48% of the film mass loss was assigned to ODA-based oligomers that sublime at 200° C. No monomeric ODA was observed after heating, indicating that the initial polyhemiaminal had formed to >98% conversion.

Figure 11:
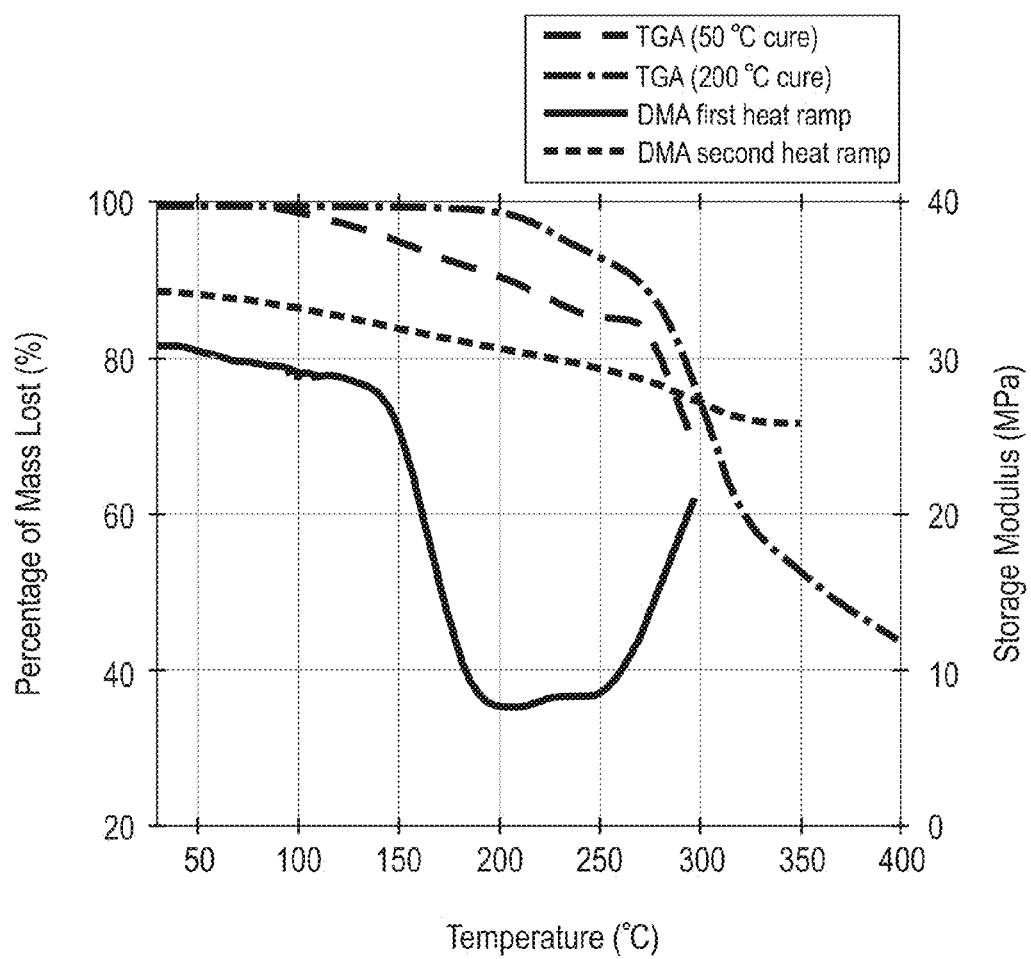
FIG. 11 is a graph showing DMA scans for storage modulus (bottom two curves) and thermogravimetric analysis (TGA, top 2 curves) scans for mass loss of films prepared with 4,4'-oxydianiline (ODA) under varying film cure conditions.

FIG. 11 is a graph showing the dynamic mechanical analysis (DMA) and thermogravimetric analysis (TGA) of ODA films under varying film cure conditions. Films cured at 50° C. (second curve from top) exhibit a larger mass loss prior to their decomposition temperature compared to those cured at 200° C. (top curve). This discrepancy is explained by loss of NMP and water when converting the polyhemiaminal (PHA) to the polyhexahydrotriazine (PHT) at elevated temperature.

The DMA profile (bottom curve) following a reaction between ODA and paraformaldehyde shows two thermal transitions in the first heat ramp, likely corresponding to reaction to form the PHA, followed by loss of NMP and water and concurrent ring closure to form the PHT. The second heat ramp (second from bottom curve) shows a storage modulus characteristic of a high-modulus polymer, with a shallow transition and only slight variance in modulus over the temperature range. The Tg observed at about 275° C. in the second heat ramp corresponds to an ODA-based PHT film cured at 200° C.

Atomic Force Microscopy (AFM) Images of PHA and PHT Films

Figure 12:
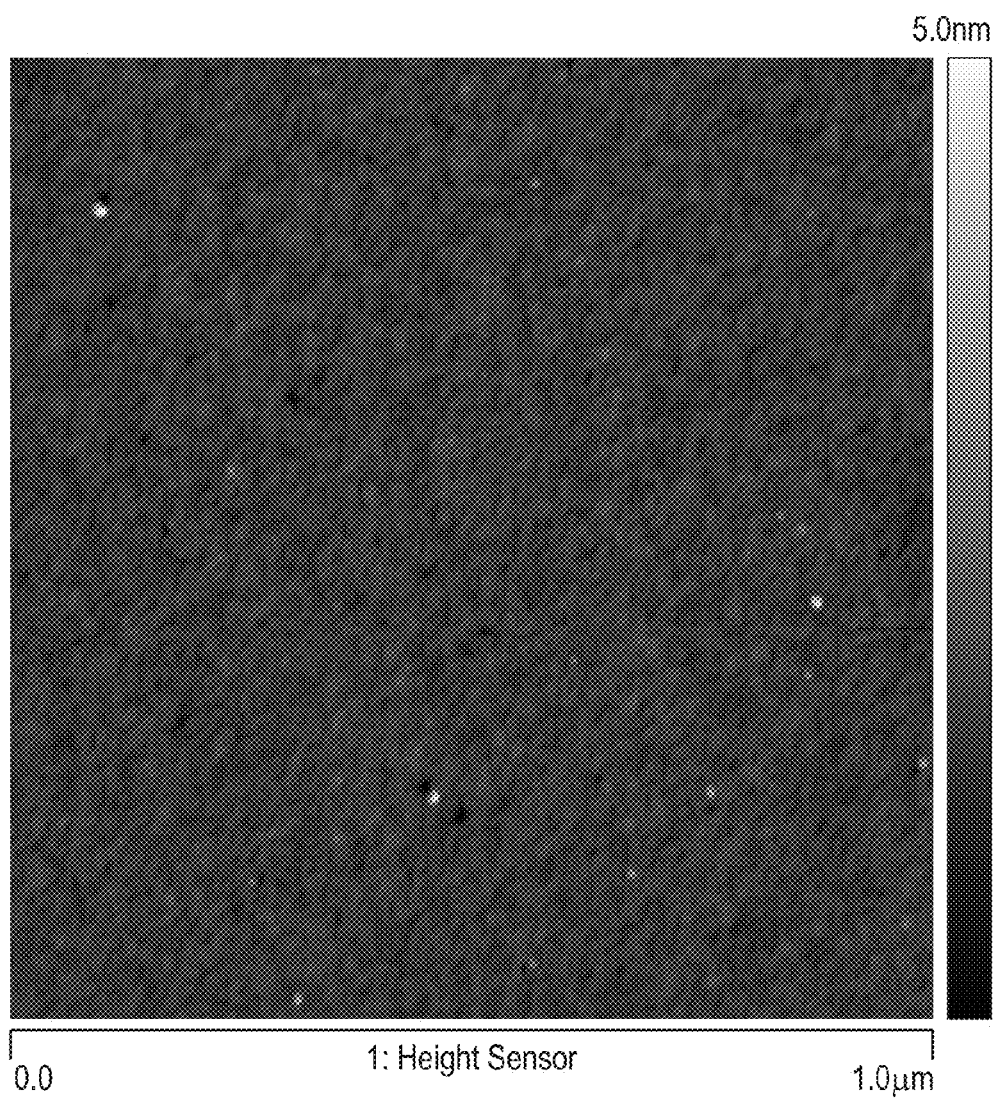
FIG. 12 is an atomic force microscope (AFM) image of the polyhemiaminal film PHA-1 (Example 6) cured at 50° C.
Figure 13:
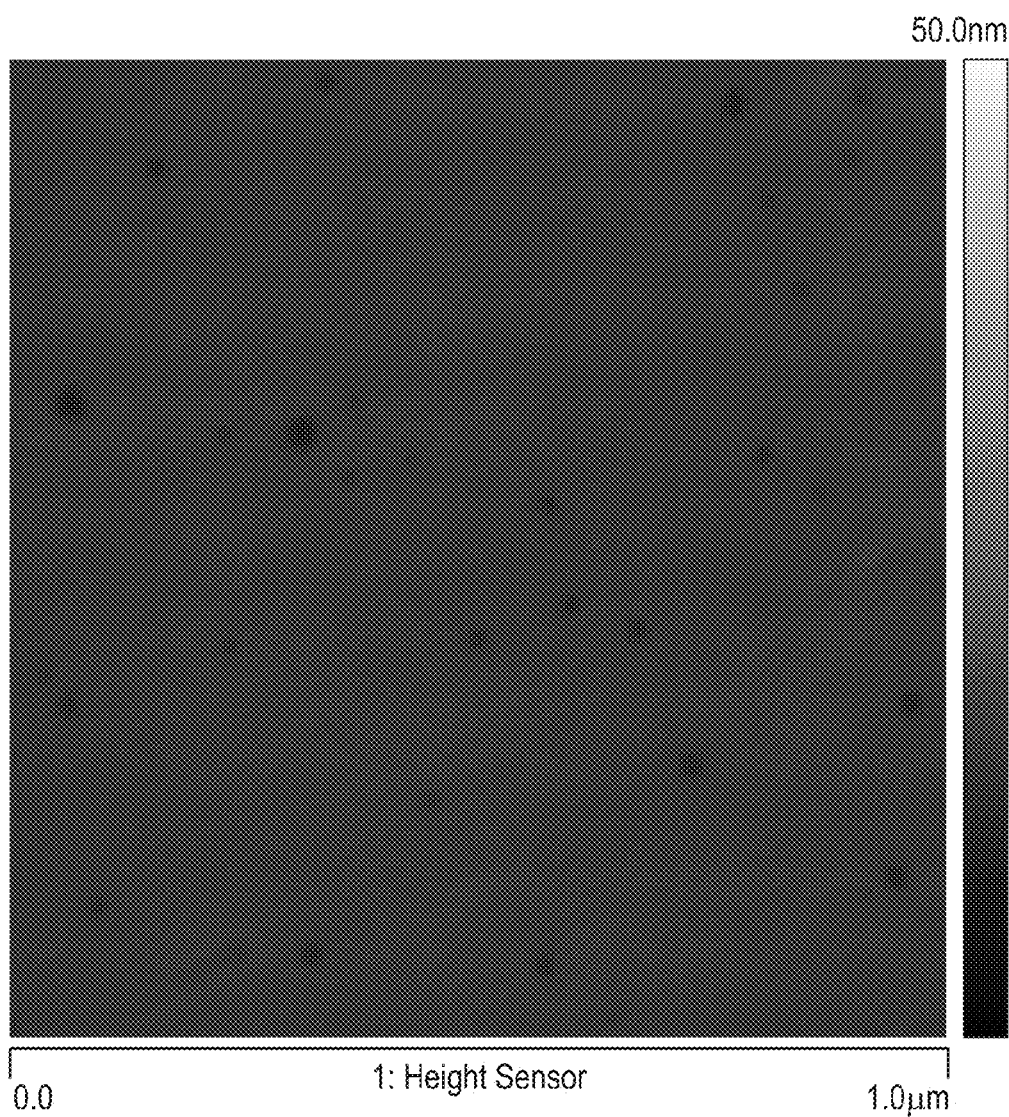
FIG. 13 is an AFM image of the polyhexahydrotriazine film PHT-1 (Example 13) was cured at 200° C.

AFM images were taken of a polyhemiaminal film PHA-1 (Example 6) cured at 50° C. (FIG. 12) and polyhexahydrotriazine film PHT-1 (Example 13) cured at 200° C. (FIG. 13) cast on silicon wafers. In each case, the surface of the film was smooth with a root mean square (RMS) roughness of 3-4 Å, consistent with an amorphous, highly crosslinked polymeric structure. The PHA-1 film showed slightly higher granularity compared to the PHT-1 film. The PHT-1 film exhibited evenly distributed holes throughout the polymer, with a depth of 22 nm and width of 55 nm, likely due to the NMP and water removal from the film at high curing temperature.

$^1$H NMR Analysis of Soluble Polymer Networks

Figure 14:
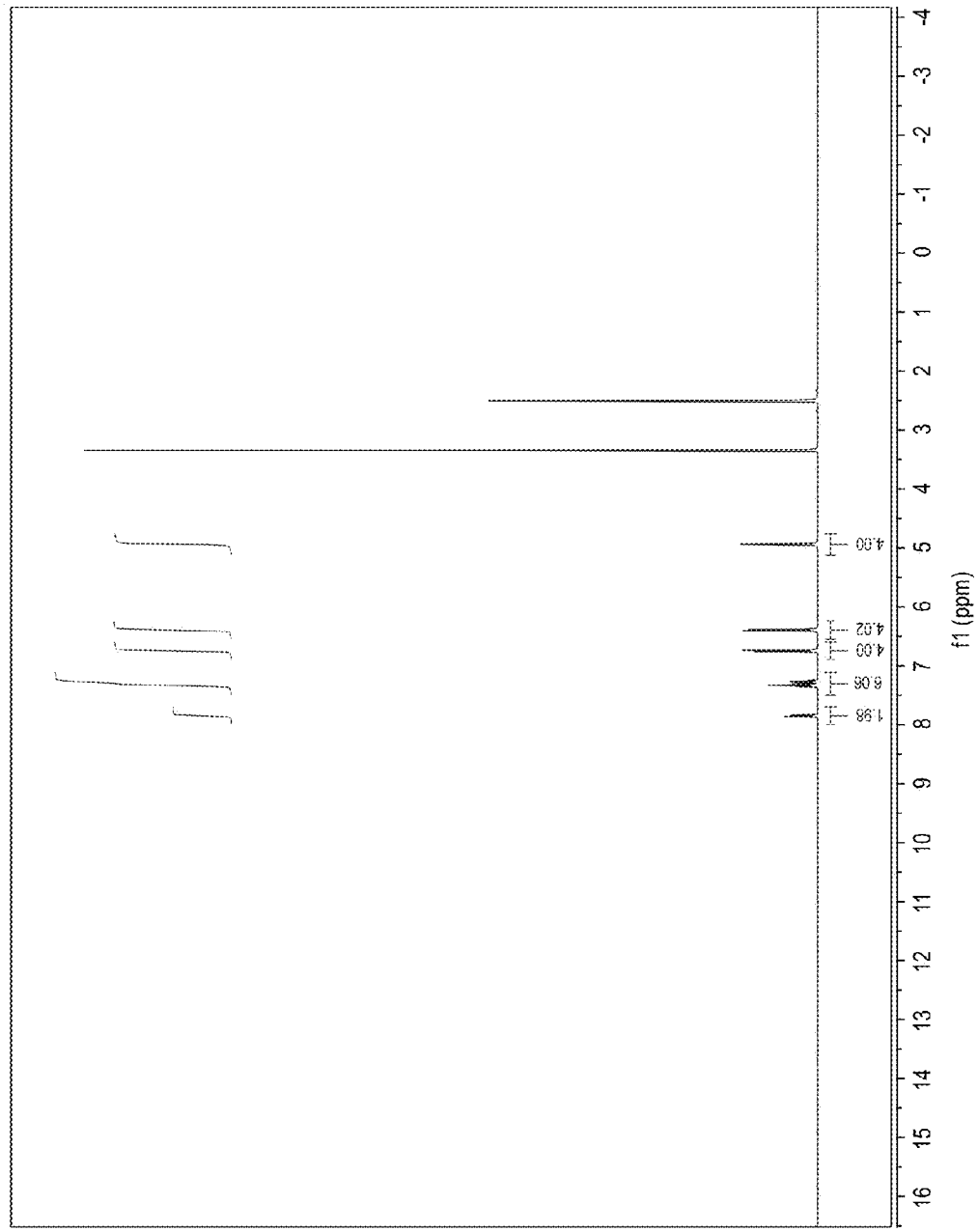
FIG. 14 is a ¹H NMR spectrum of 4,4'-(9-fluorenylidene) dianiline (FDA) monomer in d₆-DMSO.
Figure 15:
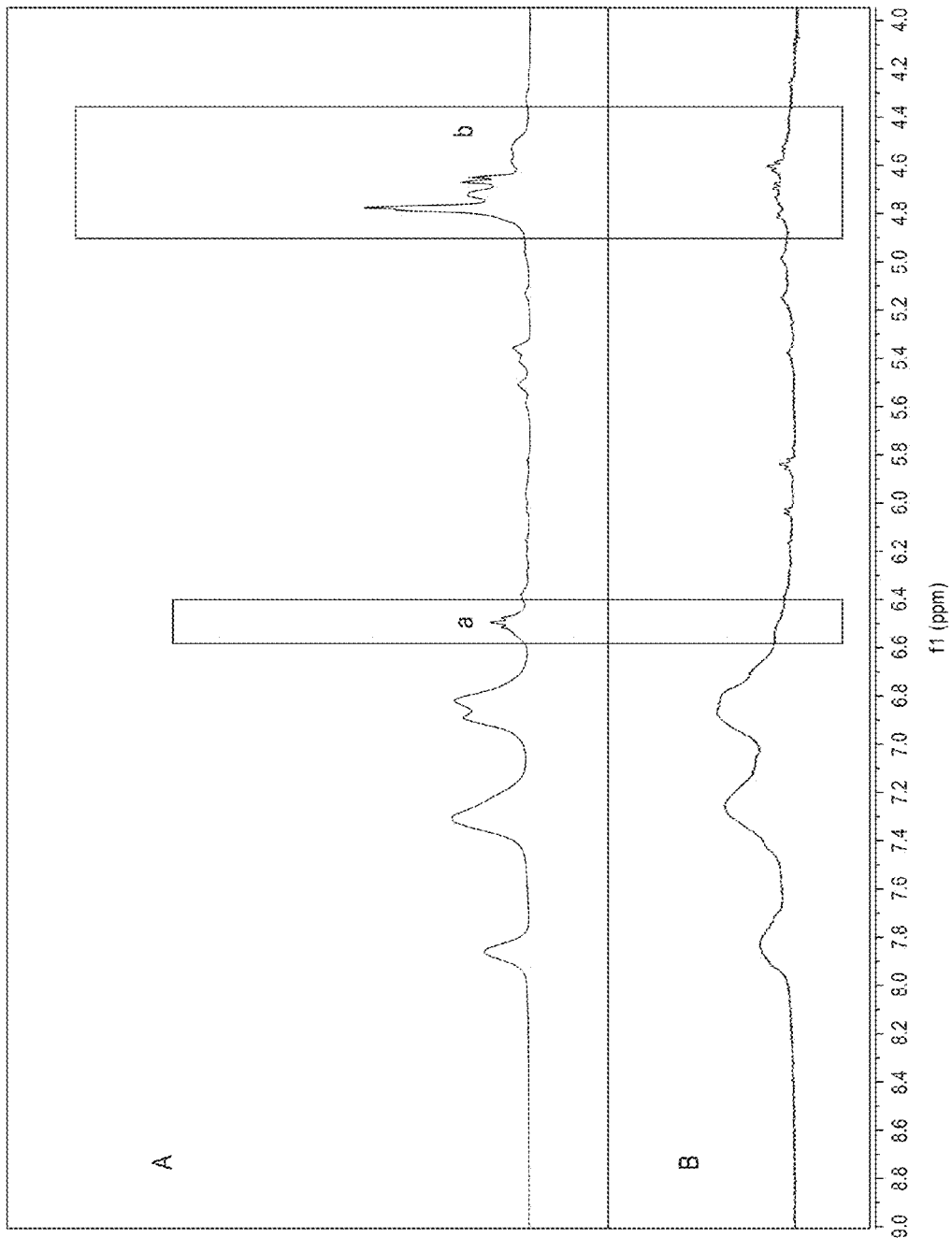
FIG. 15 is a ¹H NMR spectrum of the methylene regions of the reaction product of FDA with paraformaldehyde in NMP (¹H NMR aliquots in d₆-DMSO solvent) at different temperatures: (A) at 50° C. after 2 hours, integration of a:b=1:6 (B) at 200° C. after 2 hours.

In an attempt to form a soluble polymer for $^1$H NMR analysis, 4,4'-(9-fluorenylidene)dianiline (FDA) was used as a monomer (FIG. 14, $^1$H NMR of FDA) in place of ODA for polymerization. Under dilute conditions, the FDA-based polymers obtained after both 50° C. treatment for 0.5 hour and 200° C. treatment for 0.5 hour were sufficiently soluble in $d_6$-DMSO such that the polymer could be analyzed. Sharp signals, likely corresponding to the N—H, and O—H groups in the polyhemiaminal (PHA) were present in the spectrum of the sample polymerized at 50° C. for 2 hours (FIG. 15, $^1$H NMR spectrum labeled A) whereas the spectrum of the polyhexahydrotriazine (PHT) sample formed at 200° C. for 2 hours (FIG. 15, $^1$H NMR spectrum labeled B) showed one broad signal in the delta 4-5 ppm region.

The PHT film formed from FDA was not found to be soluble in $d_6$-DMSO (no $^1$H NMR signals corresponding to PHA, PHT, or starting dianiline were observed when the film was submerged in $d_6$-DMSO in an NMR tube), indicating that removal of the solvent during polymerization and concentration of the solution was necessary for high crosslinking when using FDA as a monomer.

Gel Permeation Chromatography (GPC)

Figure 16:
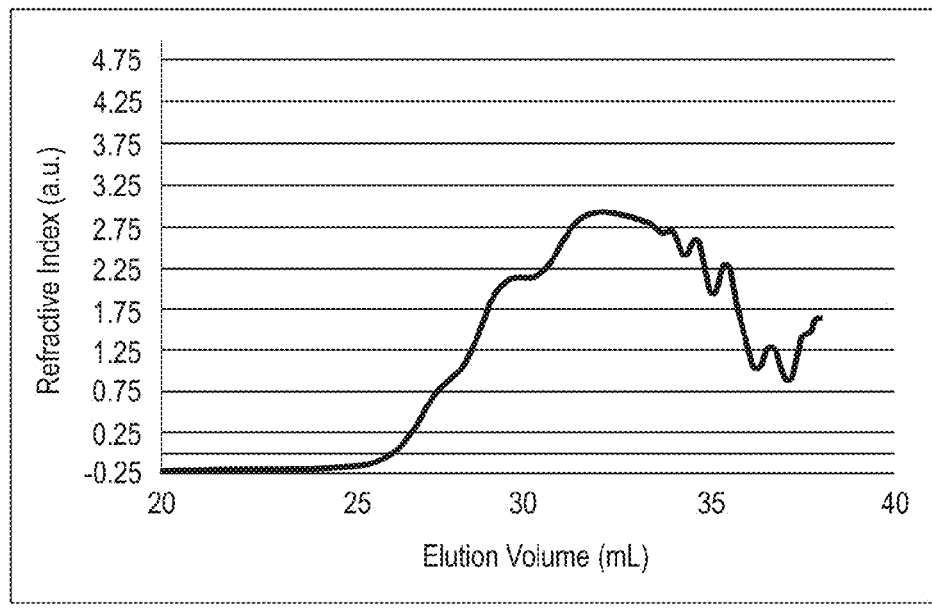
FIG. 16 is a GPC trace using THF as eluent of the polymerization product of FDA with 2.5 equiv paraformaldhyde for 2 hours at 50° C. in 0.33 M NMP. The polyhemiaminal was purified by precipitation in water. Mw=10,576, Mn=3, 588, and PDI=2.95.

FIG. 16 is a GPC trace using THF as eluent of the product formed by reaction of FDA with 2.5 equivalents of paraformaldehyde for 2 hours at 50° C. in 0.33 M NMP. The polyhemiaminal was purified by precipitation in water. Mw=10,576, Mn=3,588, and PDI=2.95.

Figure 17:
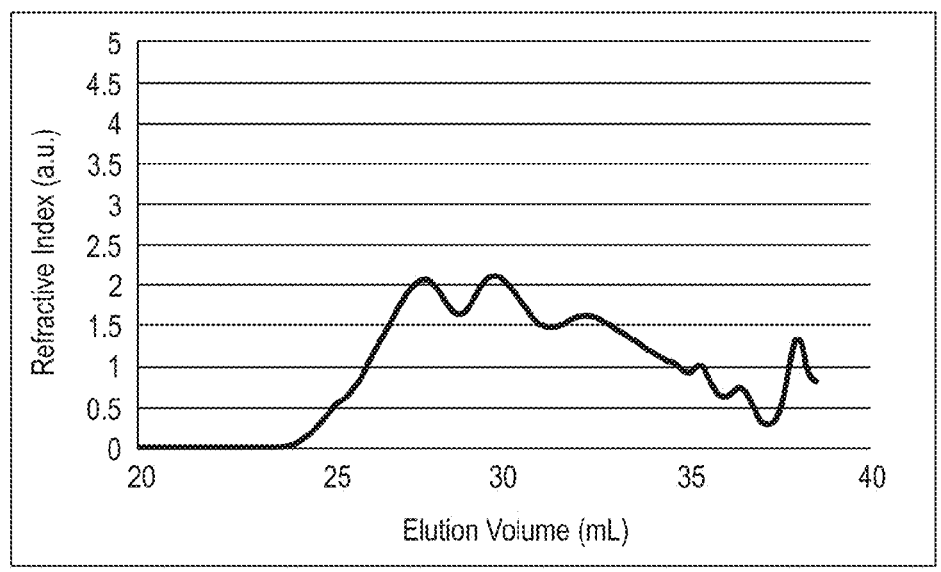
FIG. 17 is a GPC trace using THF as eluent of the polymerization product of FDA with 2.5 equiv paraformaldhyde for 2 hours at 200° C. in 0.33 M NMP. Mw=48,910; Mn=8, 174; PDI=5.9.

FIG. 17 is a GPC trace using THF as eluent of the product formed by the reaction of FDA with 2.5 equivalents of paraformaldhyde for 2 hours at 200° C. in 0.33 M NMP. Mw=48,910; Mn=8,174; PDI=5.9. The 200° C. treatment resulted in an Mn value about two times that of the polyhemiaminal, indicating that chain growth occurs at the higher temperature in addition to conversion of the hemiaminal to hexahydrotriazine.

Effect of Water and Formic Acid on Hexahydrotriazine Formation

A slight increase in conversion was observed when water was added to a polymerization solution of ODA and paraformaldehyde in DMSO at 50° C. (91% conversion vs 94% conversion, as shown in Table 6 below, entries 1 and 2). Addition of 50 mol % formic acid to the reaction mixture decreased the conversion to 50% (Table 6, entry 4). Also, the reactions with formic acid did not form gels in solution, whereas those with water did form gels. For this series of experiments, DMSO was refluxed for 108 hours over $CaH_2$ and distilled prior to use. Paraformaldehyde was washed with saturated $NaHCO_3$ to remove any acid impurities and dried prior to use. Percent conversion was determined by the $^1H$ NMR determination of new compounds with aromatic protons within 10 minutes of heating at 50° C.

TABLE 6

| Entry | Conditions | % Conversion |
|---|---|---|
| 1 | No additive- dry DMSO solvent | 91 |
| 2 | 50 mol % water added | 94 |
| 3 | 10 mol % water added | 90 |
| 4 | 50 mol % formic acid | 50 |
| 5 | 10 mol % formic acid | 65 |

X-Ray Diffraction (XRD) Analysis of ODA-Based PHT Films

Figure 18:
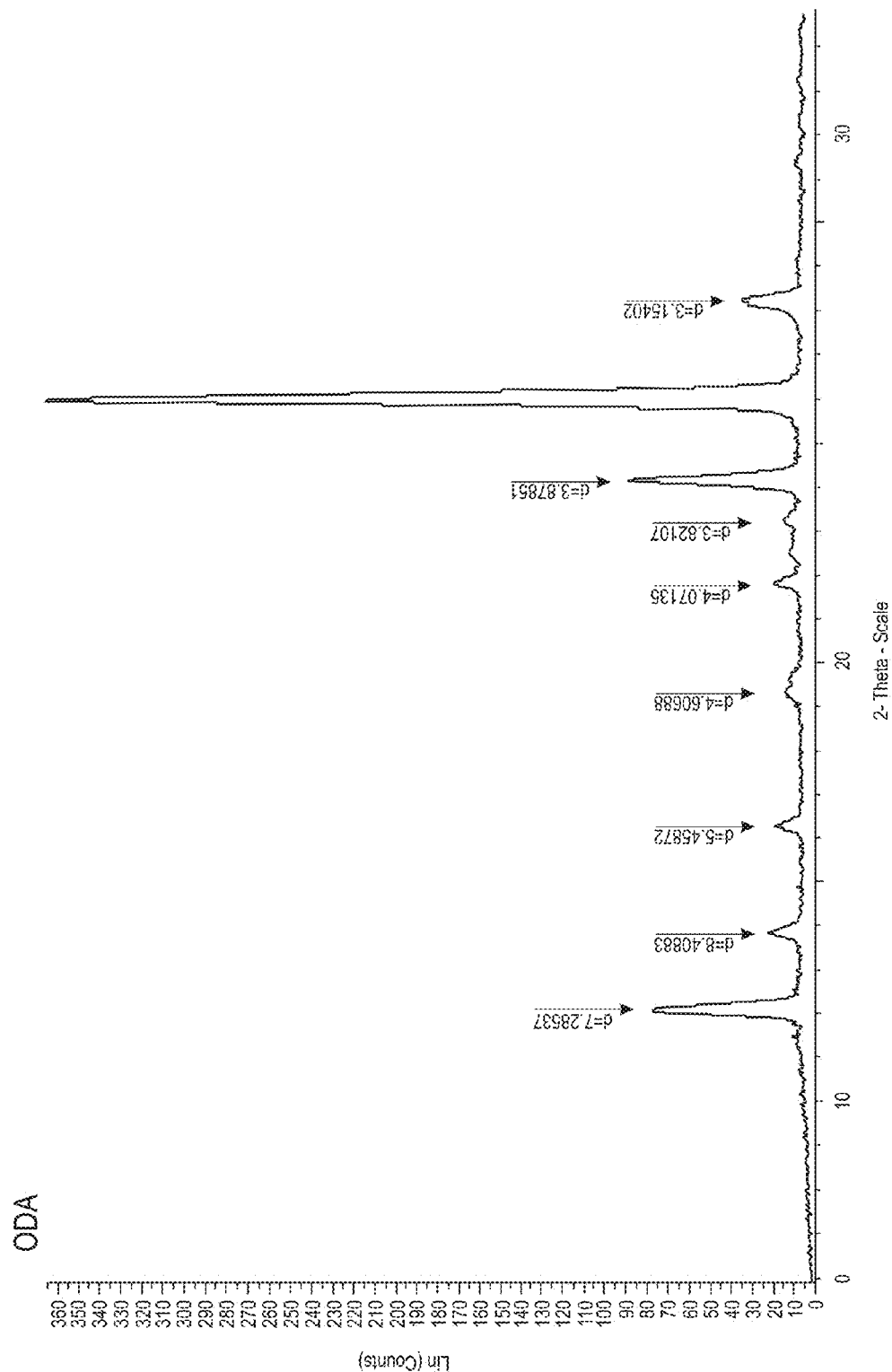
FIG. 18 is an XRD pattern obtained for crystalline 4,4'-oxydianiline (ODA) monomer.
Figure 19:
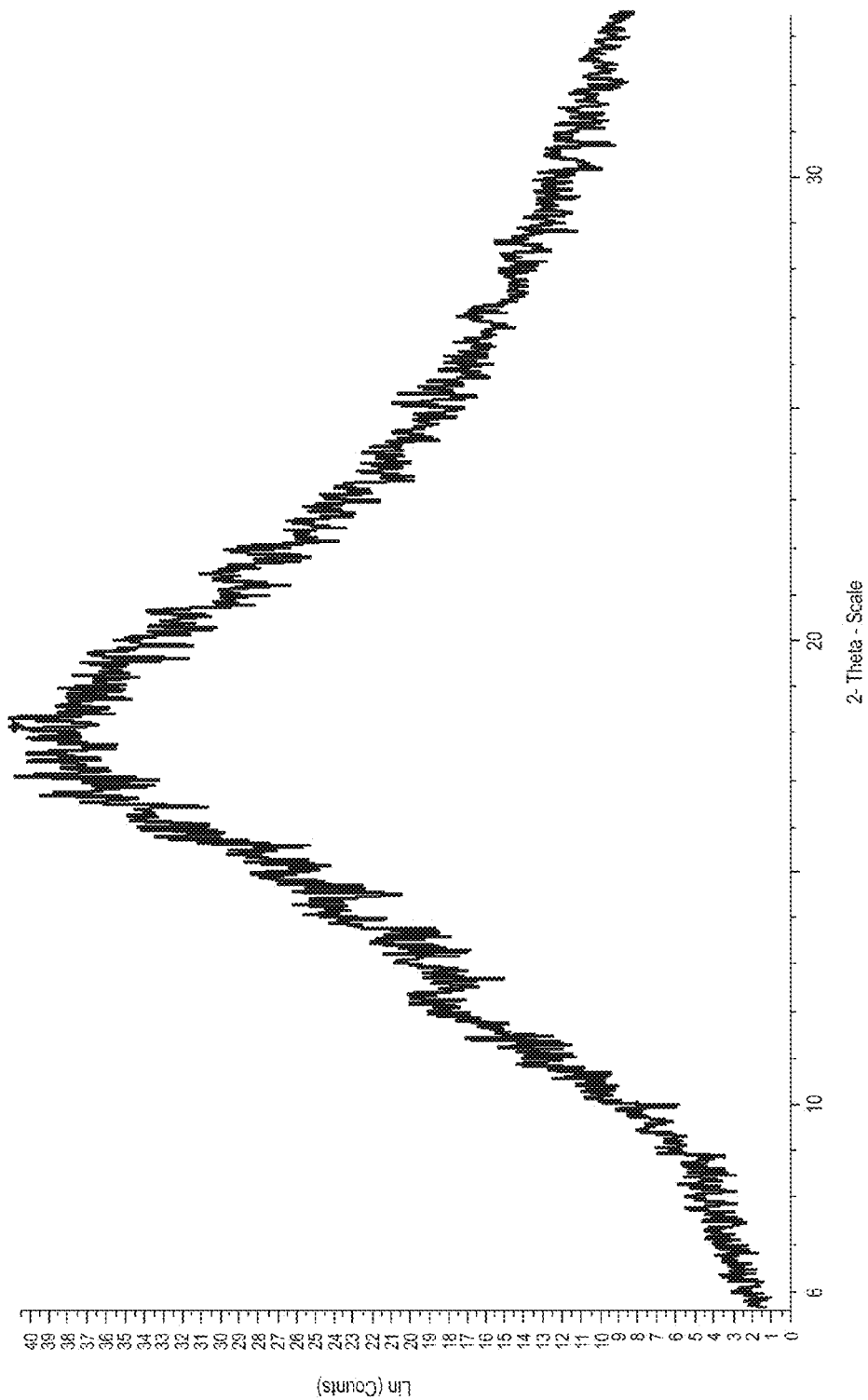
FIG. 19 is an XRD pattern showing diffuse scattering observed for the polyhexahydrotriazine (PHT) film formed with ODA.

FIG. 18 is an XRD pattern observed for crystalline ODA monomer. FIG. 19 is an XRD pattern showing diffuse scattering observed for an ODA based PHT film.

Young's Modulus and Hardness Obtained by Nanoindentation of Films

Figure 20:
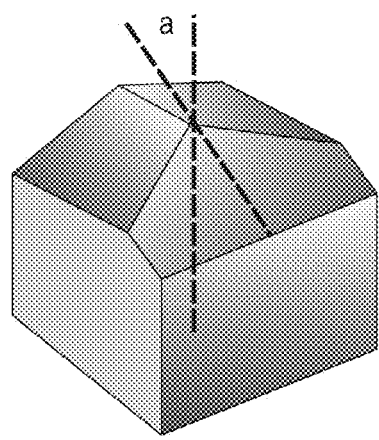
FIG. 20 is a drawing of the cube-corner geometry of the nanoindenter probe. The probe has a pyramid angle of 90° and an end radius of about 50 nm. Angle a=90°.

Nanoindentation measurements were performed using a Hysitron Triboindenter (TI-950) with a cube-corner probe (FIG. 20, drawing) having a pyramid angle of 90° and an end radius of about 50 nm. Angle a=90° C. in FIG. 20. The sample films had a thickness of about 4 micrometers and were mounted with a cyanoacrylate (SUPER GLUE) onto a stainless steel substrate 15 mm in diameter and 700 micrometers thick. The thickness of the films (about 4 micrometers) was much greater compared to the indentation depth (about 100 nm). Therefore, substrate effects were minimal if not absent from the measurements. The load function was 5-2-5 (i.e., 5 second load, 2 second hold, and 5 second unload). Prior to indenting onto samples of interest, the probe was calibrated using a quartz sample having a thickness of 1 mm, which was mounted using the same procedure as the samples. A total of three coefficients (for the zeroth, first and second order, respectively) were used to calibrate the probe, as the indentation depth was small. The quartz modulus was 70 GPa and hardness was 9.7 GPa. Between the samples the probe was both cleaned and calibrated using indents in quartz. Seven different indentation loads were chosen for measurements on each sample: 3 μN, 5 μN, 7.5 μN, 10 μN, 12.5 μN, 15 μN, and 20 μN. Seven independent repeats of each load separated at least by 10 micrometers in the X and the Y dimensions were performed to avoid any possibility of strain field coupling between two indents. For each load, the modulus was measured and an average modulus was determined from at least 25 independent data points from between 5 μN and 15 μN. The raw data was corrected for the point of zero force and zero displacement. This is a standard offset made for low load indents and lends to more correct use of nanoindentation models.

The reported average reduced modulus values are at least 20 independent data points averaged together. The graphs were plotted with +/− one standard deviation on the values for each load.

Figure 21:
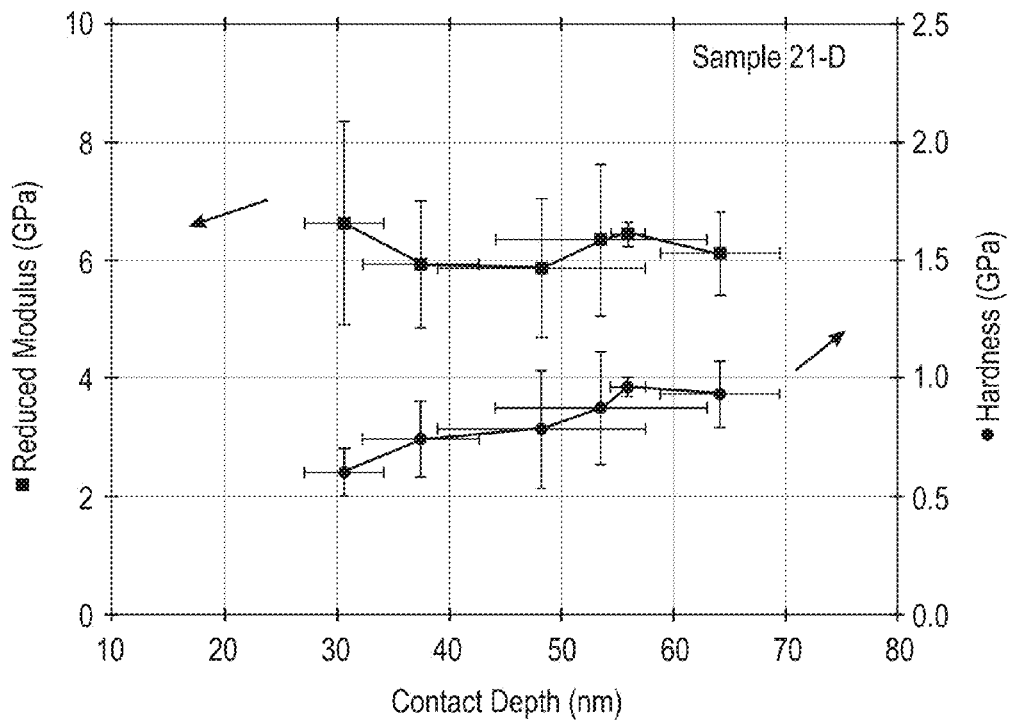
FIG. 21 is a graph showing the reduced modulus and hardness data for Example 6.

FIG. 21 is a graph showing the reduced modulus and hardness data for Example 6.

Figure 22:
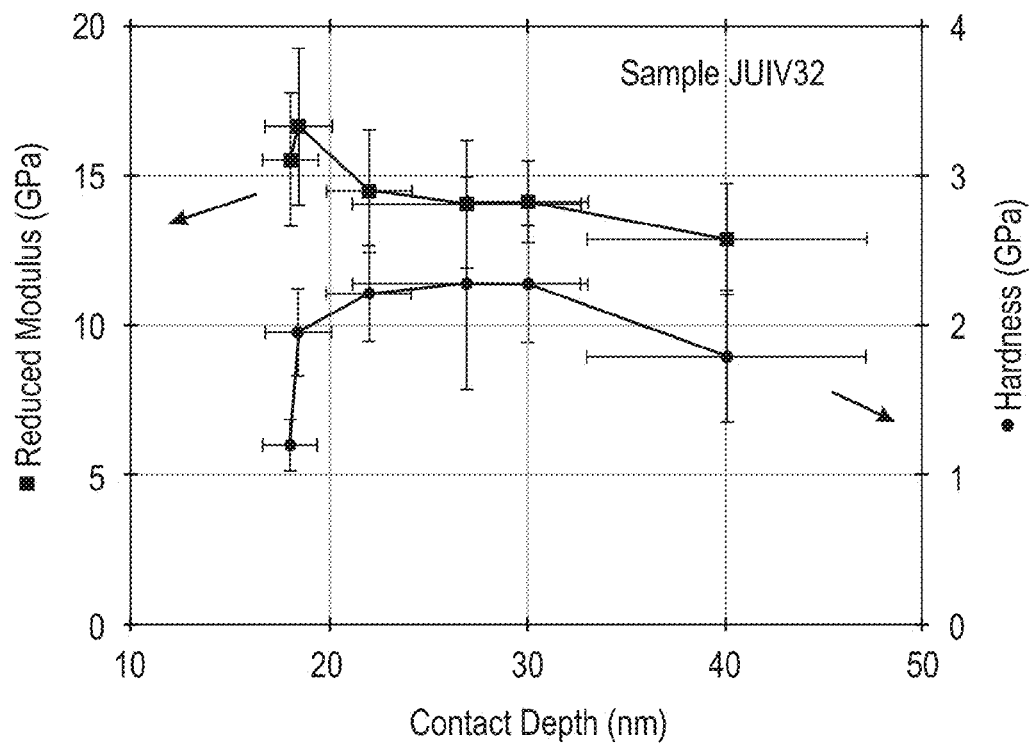
FIG. 22 is a graph showing the reduced modulus and hardness data for Example 13.

FIG. 22 is a graph showing the reduced modulus and hardness data for Example 13.

Figure 23:
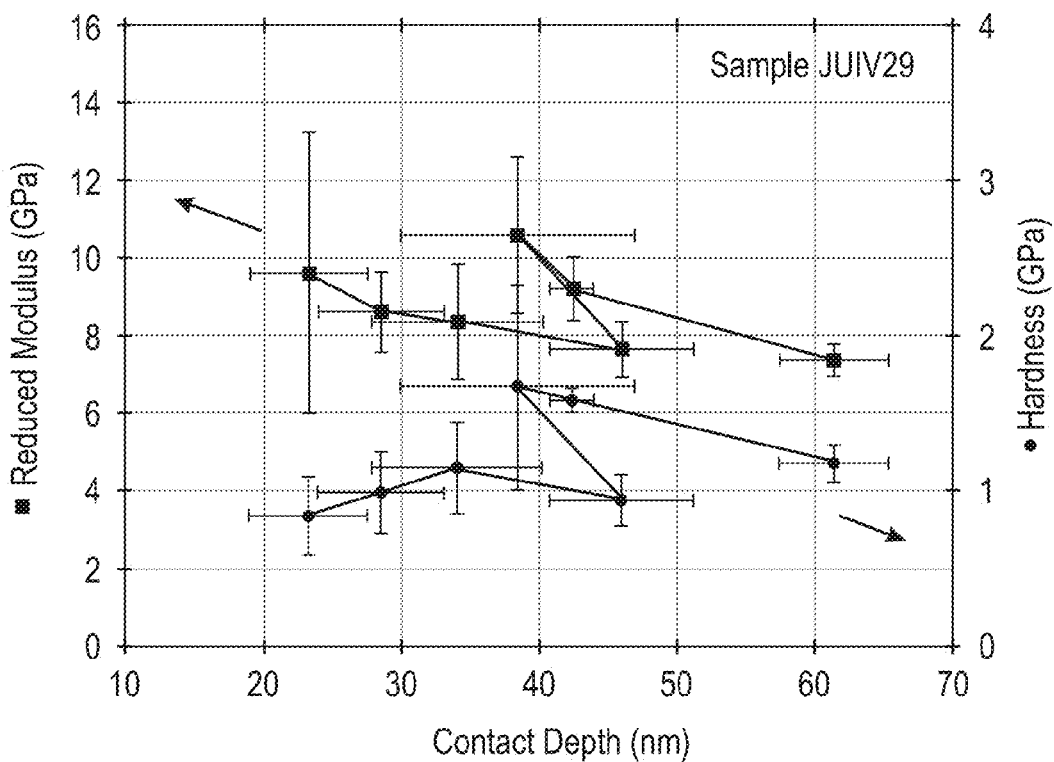
FIG. 23 is a graph showing the reduced modulus and hardness data for Example 14.

FIG. 23 is a graph showing the reduced modulus and hardness data for Example 14.

Figure 24:
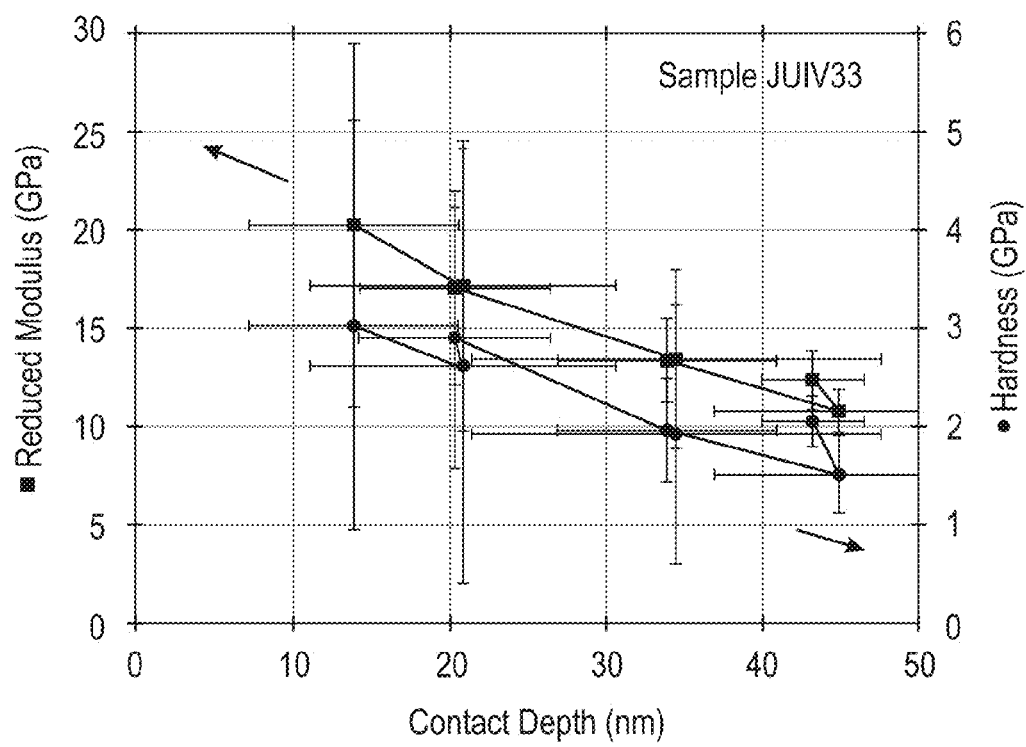
FIG. 24 is a graph showing the reduced modulus and hardness data for Example 15.

FIG. 24 is a graph showing the reduced modulus and hardness data for Example 15.

Table 7 summarizes the reduced modulus (Er) and hardness (H) of the films determined by nanoindentation. Example 6 is a polyhemiaminal film, and Examples 13-15 are polyhexahydrotriazine films.

TABLE 7

| Example | Name | Monomer | Monomer:PF (mole ratio) | Cure Condition (see Code)[a] | Film Forming? | Er (GPa)[b] | H (GPa)[b] |
|---|---|---|---|---|---|---|---|
| 6 | PHA-1 | ODA | 1:5 | 1 | Yes | 6.3 | 0.86 |
| 7 | PHA-2 | ODA | 1:6.7 | 1 | Yes | | |
| 8 | PHA-3 | ODA | 1:10 | 1 | Yes | | |
| 9 | PHA-4 | MDA | 1:5 | 1 | Yes | | |
| 10 | PHA-5 | FDA | 1:5 | 1 | Yes | | |
| 11 | PHA-6 | HMDA | 1:5 | 1 | No | | |
| 12 | PHA-7 | PEG-DA | 1:5 | 1 | Yes | | |
| 13 | PHT-1 | ODA | 1:2.5 | 2 | Yes | 14 | 2 |
| 14 | PHT-2 | ODA | 1:5 | 2 | Yes | 8 | 1.9 |
| 15 | PHT-3 | ODA | 1:10 | 2 | Yes | 11 | 1.9 |
| 16 | PHT-4 | ODA | 1:2.5 | 3 | Yes | | |
| 17 | PHT-5 | MDA | 1:2.5 | 2 | Yes | | |
| 18 | PHT-6 | FDA | 1:2.5 | 2 | Yes | | |

TABLE 7-continued

| Example | Name | Monomer | Monomer:PF (mole ratio) | Cure Condition (see Code)[a] | Film Forming? | Er (GPa)[b] | H (GPa)[b] |
|---|---|---|---|---|---|---|---|
| 19 | PHT-7 | HMDA | 1:2.5 | 2 | No | | |
| 20 | PHT-8 | PEG-DA | 1:2.5 | 2 | No | | |

[a]Codes 1, 2, and 3 represent the following reaction conditions:
1 = NMP, 50° C., 24 hours;
2 = NMP, 50° C., 1 hour, ramp 50-200° C. over 1 hour, 200° C. 1 hour;
3 = PC, 50° C., 1 hour, ramp 50-200° C. over 1 hour, 200° C. 1 hour;
[b]Er = reduced modulus; H = hardness determined by nanoindentation Without being bound by theory, the 6 GPa spread in Examples 13-15 is believed to be due to variability in film uniformity as the paraformaldehyde content was increased from 2.5 equivalents to 10 equivalents. As the paraformaldehyde level was increased, holes formed where the formaldehyde blew out of the film during casting. Examples 14 and 15 were non-uniform, whereas Example 13 was highly uniform. Residual levels of excess paraformaldehyde can also plasticize the film, lowering the modulus significantly.

Density Functional Theory (DFT) Calculations

Figure 25:
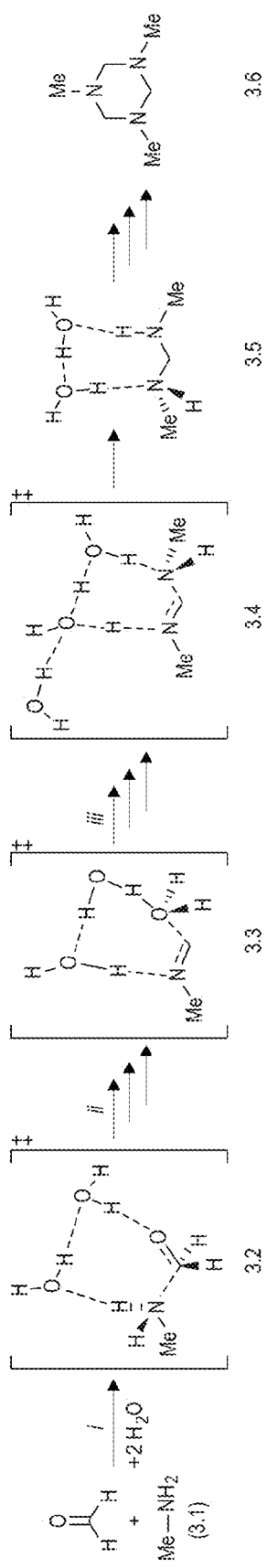
FIG. 25 is a reaction diagram showing the formation of a hexahydrotriazine from formaldehyde and methylamine based on density functional theory (DFT) calculations.

The dispersion-corrected B3LYP DFT method was used to investigate the mechanism and energetics for 1,3,5-trimethyl-1,3,5-triazinane formation from the reaction of formaldehyde with methylamine, a simple (computationally inexpensive) amine, as shown in the reaction diagram of FIG. 25).

The DFT calculations assume paraformaldehyde initially degrades in the reaction conditions to form a formaldehyde monomer that reacts with the amine to form N,N'-dimethyl-methanimidamide:

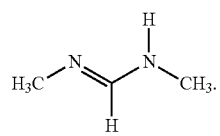

Overall, the reaction proceeds through the consecutive addition of amine and formaldehyde reactants. The proposed mechanism invokes catalysis by two explicit water molecules throughout the reaction. A catalytic amount of water can be available to promote the reaction by way of trace amounts of water initially present in the reaction mixture and/or water formed by the reaction of amine with formaldehyde.

The DFT calculations indicate that three general types of transformations are involved in the reaction mechanism promoted by water: (i) addition of formaldehyde to an amine, (ii) the formation of imine by elimination of water byproduct, and (iii) addition of an amine to an imine (FIG. 25). Intermediates are smoothly transformed from weakly hydrogen-bonded complexes to covalently bonded intermediates without discernible transition structures for transformations involving condensation of an amine with formaldehyde or with an imine. Transition structures could be found, however, for processes in which only protons are shuttled from the amine to formaldehyde (or imine intermediates) with water molecules after the addition of an amine to formaldehyde or to an imine. These transformations possess low barriers, often less than 3 kcal/mol. By comparison, transition structures for imine formation/water elimination could be found that possess much larger free energies of activation.

Figure 26:
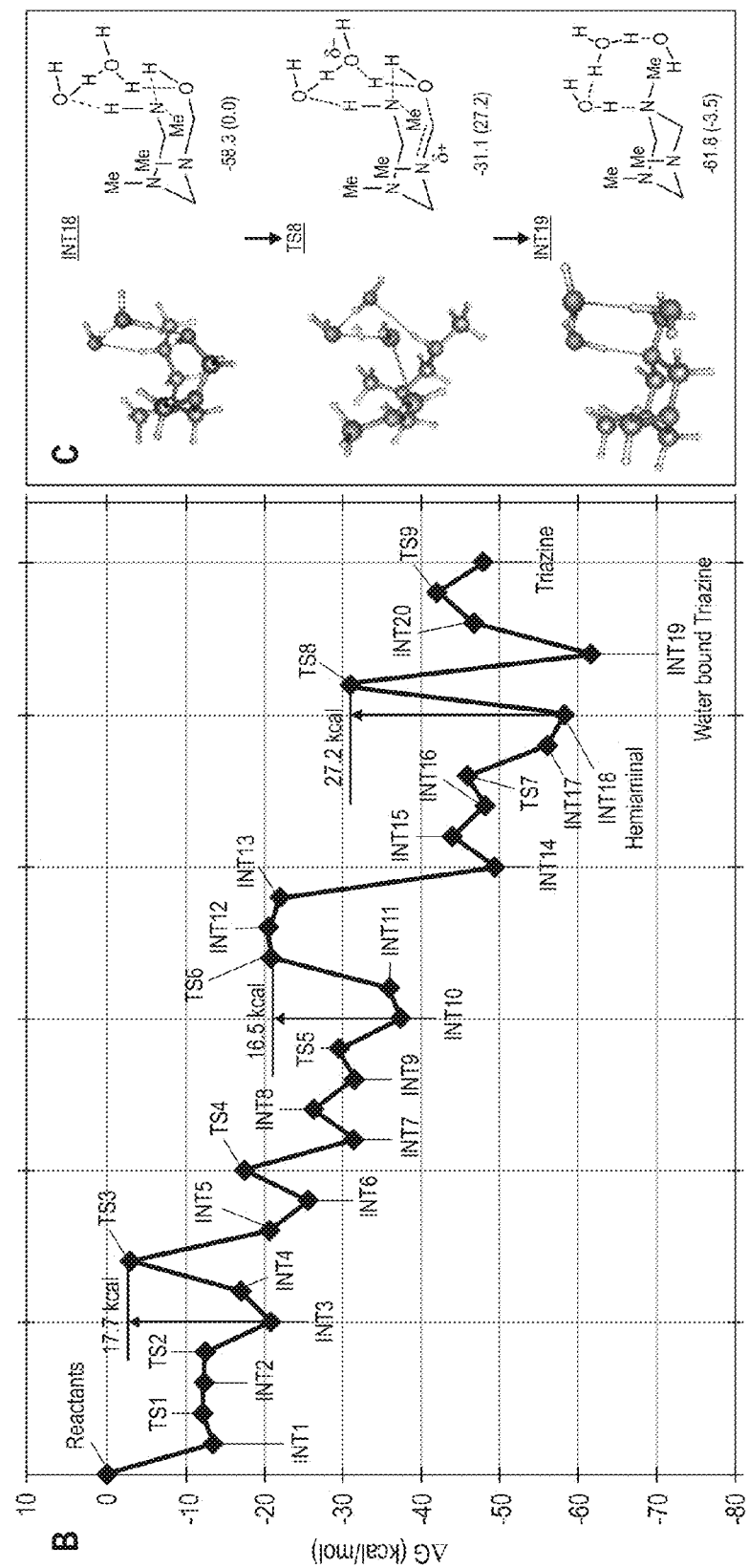
FIG. 26 is a free energy diagram for the formation of hexahydrotriazine from formaldehyde and methylamine based on density functional theory (DFT) calculations.

The largest calculated free energy barrier arises from elimination of water from INT18 (where "INT" refers to intermediate) in TS8 (where "TS" refers to transition state) (FIG. 26, energy diagram). While water loss during previous stages in the mechanism, such as from INT3 in TS3 and from INT10 in TS6, results in the formation of a neutral imine, such a transformation from INT18 would result in the formation of an iminium-amide intermediate, which is unstable because of its zwitterionic character and is therefore responsible for this large free-energy barrier. In fact, as confirmed by intrinsic reaction coordinate (IRC) calculations, elimination of water from INT18 in TS8 is followed by spontaneous cyclization of the iminium-amide intermediate to form the 1,3,5-hexahydro-1,3,5-triazine in INT19 (FIG. 26). The large free energy barrier between INT18 and TS9 is particularly important because INT18 is the hemiaminal structure. The DFT calculations indicate that the hemiaminal is a relatively stable intermediate during 1,3,5-hexahydro-1,3,5-triazine formation.

The calculations are consistent with the $^1$H NMR and IR analyses of polyhemiaminal and polyhexahydrotriazine formation. When formed with aromatic amines, the polyhemiaminal structure is experimentally observed to form at low temperatures (~50° C.), and is a stable intermediate up to temperatures less than 150° C. Without being bound by theory, the formation of PHTs from aromatic diamines may require temperatures of at least 150° C. in order to overcome energy barriers associated with solvent and/or water stabilization of the polyhemiaminal structure.

DFT calculations indicate that the hemiaminal is further stabilized by NMP. Calculations revealed that displacement of bound water molecules from INT18 by NMP solvent produces a complex in which NMP is hydrogen-bonded to the hexahydrotriazine precursor; this process is exothermic by 7.7 kcal/mol (FIG. 26). Thus, the total free energy required for hexahydrotriazine formation after exposure to NMP must be a combination of the energy required to displace the solvent and that required to eliminate water, which is 34.9 kcal/mol. The DFT calculations suggest that the condensation between ODA and formaldehyde at 50° C. results in the formation of a solvent-stabilized intractable polyhemiaminal intermediate (i.e., the NMP/water-bound polyhemiaminal), whereas polyhexahydrotriazine formation will only occur at higher temperatures (e.g., 200° C.) where the water-bound polyhemiaminal is converted to the polyhexahydrotriazine through a high-energy transition state.

The DFT calculations suggest that, when heated above the boiling point of NMP and $H_2O$, a polyhemiaminal film will lose significant weight associated with the loss of both, as they are tightly bound to the polyhemiaminal at room temperature. In fact, thermogravimetric analysis (TGA) of ODA polyhemiaminal films cured at 50° C. showed 10-20% weight loss when heated above 100° C. (FIG. 11). Experiments also revealed that 52% of the total mass lost while heating an ODA-based polyhemiaminal film was due to NMP and water desorption (thereby accounting for 27 wt % (weight percent)

of the polyhemiaminal). Additionally, NMP swelling measurements used to survey the crosslink density of polyhemiaminal films showed no swelling. DFT calculations suggest that NMP stabilizes the hemiaminal structure by 7.7 kcal/mol. No additional NMP uptake by the film was observed, indicating NMP saturation is achieved during polyhemiaminal formation in the presence of excess NMP. TGA analysis up to ~300° C. (the decomposition temperatures of the polymers) of ODA films cured at 200° C. showed less weight loss than the films cured at 50° C., confirming that solvent is no longer present in the PHT film after high temperature curing, as is also indicated by the IR spectroscopy results.

CONCLUSION

The disclosed method of preparing polyhexahydrotriazines from electron rich aromatic diamines provides intermediate polyhemiaminals, which are stable up to temperatures less than 150° C. When heated to temperatures of at least 150° C., the polyhemiaminals form crosslinked polyhexahydrotriazines having a high Tg and a high Young's modulus. The polyhexahydrotriazines are rigid according to DMA analysis.

Electron-deficient diamines did not form polyhemiaminals and were generally unreactive towards paraformaldehyde. Polyhemiaminal formation was favored by electron-rich aromatic diamines. Optimal conditions for the formation of polyhemiaminals used about 5 molar equivalents of formaldehyde relative to aromatic diamine. Decreasing the amount of formaldehyde resulted in polyhemiaminal films generally not suitable for mechanical analysis, or produced low quality films. Increasing the amount of formaldehyde to 6.7 or 10 equivalents adversely affected the mechanical properties of the films. For example, the PHA film Tg decreased with increasing formaldehyde (e.g., Tg=115° C. for PHA-1 vs Tg=100° C. for PHA-2). Also, a PHA film synthesized with 10 equivalents of formaldehyde had a lower temperature for 5% mass loss compared to a PHA film formed with 5 equivalents formaldehyde (compare PHA-3 to PHA-1 for 5% mass loss, 150° C. vs 165° C., Table 5), presumably due to the desorption of the excess formaldehyde from the film. When the curing procedure was adjusted for forming the polyhexahydrotriazine (PHT), films of high quality and excellent mechanical properties were obtained using 2-2.5 equivalents of formaldehyde.

PHA and PHT films formed with electron-rich bisanilines MDA and FDA generally did not perform as well as the ODA-based films. However, these films still had high Tg and storage moduli as determined by DMA. The polymer prepared from hexamethylenediamine (HMDA) was not a good film-former, and the polymer exhibited a lower Tg than aromatic based PHAs and PHTs. The film formed with PEG-DA was found to have decreased storage modulus compared to its aromatic analogues as determined by DMA (700 MPa), and the PEG-DA based film dissolved in water upon standing for 24 hours. When the temperature was increased to match conditions for PHT formation with anilines, no reaction to form a PHA film or PHT film was observed with PEG-DA.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

What is claimed is:

1. A method, comprising:

forming a reaction mixture comprising a i) solvent, ii) paraformaldehyde, and iii) a monomer comprising two primary aromatic amine groups; and heating the reaction mixture at a temperature of 150° C. to about 280° C., thereby forming a polyhexahydrotriazine (PHT).

2. A method, comprising:

forming a first mixture comprising a i) solvent, ii) paraformaldehyde, and iii) a monomer comprising two primary aromatic amine groups;

heating the first mixture at a temperature of about 20° C. to about 120° C., thereby forming a second mixture comprising a polyhemiaminal (PHA);

casting the second mixture on a surface of a substrate, thereby forming an initial film layer disposed on the surface, the initial film layer comprising the PHA and the solvent; and heating the initial film layer at a temperature of 150° C. to about 280° C., thereby forming a second film layer comprising a polyhexahydrotriazine (PHT).

3. The method of claim 2, wherein the solvent is selected from the group consisting of N-methylpyrollidone (NMP), propylene carbonate (PC), dimethylacetamide (DMA), dimethylsulfoxide (DMSO), propylene glycol methyl ether acetate (PGMEA), dimethylformamide (DMF), and combinations thereof.

4. The method of claim 2, wherein the monomer is selected from the group consisting of 4,4'-oxydianiline (ODA), 4,4'-methylenedianiline (MDA), p-phenylenediamine (PD), 4,4'-(9-fluorenylidenyl)dianiline (FDA), and combinations thereof.

5. The method of claim 2, wherein said heating the initial film layer is performed at a temperature of about 150° C. to about 220° C.

6. The method of claim 2, wherein the first mixture further comprises a diluent monomer comprising one primary aromatic amine group.

7. The method of claim 6, wherein the diluent monomer is N,N-dimethyl-p-phenylenediamine (DPD), and the PHT comprises a plurality of N,N-dimethyl-p-phenylene groups:

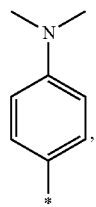
wherein the aromatic carbon represented as bonded to an asterisk of the diluent group is covalently linked to a nitrogen of a hexahydrotriazine group.
8. The method of claim 2, wherein the film layer comprising the PHT has a Young's modulus of about 8 GPa to about 14 GPA.
* * * * *